United States Patent
Maamari et al.

(10) Patent No.: US 12,513,708 B2
(45) Date of Patent: Dec. 30, 2025

(54) PARTIAL UPLINK TRANSMISSION FOR MULTIPLE UPLINK TRANSPORT BLOCKS

(71) Applicant: QUALCOMM Incorporated, San Diego, CA (US)

(72) Inventors: Diana Maamari, San Diego, CA (US); Linhai He, San Diego, CA (US); Ahmed Elshafie, San Diego, CA (US); Wei Yang, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 456 days.

(21) Appl. No.: 18/165,687

(22) Filed: Feb. 7, 2023

(65) Prior Publication Data
US 2024/0267923 A1 Aug. 8, 2024

(51) Int. Cl.
*H04W 72/23* (2023.01)
*H04L 1/00* (2006.01)
*H04L 5/00* (2006.01)
*H04B 7/06* (2006.01)

(52) U.S. Cl.
CPC ........... *H04W 72/23* (2023.01); *H04L 1/0008* (2013.01); *H04L 5/0055* (2013.01); *H04B 7/0626* (2013.01)

(58) Field of Classification Search
CPC .... H04W 72/23; H04L 1/0008; H04L 5/0055; H04B 7/0626
USPC .......................................................... 370/329
See application file for complete search history.

(56) References Cited

U.S. PATENT DOCUMENTS

| | | | |
|---|---|---|---|
| 2016/0198456 A1* | 7/2016 | Yin | H04L 5/0023 370/329 |
| 2019/0059013 A1* | 2/2019 | Rahman | H04L 1/00 |

* cited by examiner

*Primary Examiner* — Mang Hang Yeung
(74) *Attorney, Agent, or Firm* — Holland & Hart LLP

(57) ABSTRACT

Methods, systems, and devices for wireless communications are described that provide for transmitting two or more transport blocks in an uplink transmission, in which a transmitting device may skip transmissions in some portion of a set of allocated resources for the transport blocks. Uplink data may be encoded to be transmitted via the multiple transport blocks, where a first transport block may have first transport block size that is different than a second transport block size of a second transport block. The transport block sizes may be less than the size of the set of allocated resources, and the transport blocks may be transmitted via the different transmission layers, and a portion of the allocated resources may be unused. The transmitting device may provide an indication of the unused resources for use in decoding the transport blocks.

30 Claims, 22 Drawing Sheets

PARTIAL UPLINK TRANSMISSION FOR MULTIPLE UPLINK TRANSPORT BLOCKS

FIELD OF TECHNOLOGY

The following relates to wireless communications, including partial uplink transmission for multiple uplink transport blocks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a network entity may provide a grant of uplink resources that are to be used by a transmitting device (e.g., a UE) to transmit uplink communications. Efficient techniques for using resources of uplink grants may help to enhance the efficiency and reliability of wireless communications.

SUMMARY

The described techniques relate to improved methods, systems, devices, and apparatuses that support partial uplink transmission for multiple uplink transport blocks. For example, the described techniques provide for transmitting two or more transport blocks in an uplink transmission, in which a transmitting device (e.g., a user equipment (UE)) may skip transmissions in some portion of a set of allocated resources for one or more of the transport blocks. In some cases, the multiple transport blocks may be transmitted concurrently via two or more transmission layers, and an uplink grant may provide the set of uplink resources for two or more transport blocks via different transmission layers. Uplink data may be encoded to be transmitted via the multiple transport blocks, where a first transport block may have first transport block size that is different than a second transport block size of a second transport block. Further, the transport block sizes may be less than the resource allocation size of the uplink grant. In some cases, the first transport block and the second transport block may be transmitted via the different transmission layers, and a portion of the allocated uplink resources may be unused. The transmitting device may provide an indication of the unused resources for use in decoding the transport blocks.

A method for wireless communication at a UE is described. The method may include receiving an uplink grant for a set of uplink resources having a first resource allocation size for transmission of at least a first transport block and a second transport block via different transmission layers, encoding data to be transmitted via the first transport block and the second transport block, the first transport block having a first transport block size that is different than a second transport block size of the second transport block, and at least the first transport block size is less than the first resource allocation size of the uplink grant associated with the first transport block, transmitting the first transport block and the second transport block via the different transmission layers, at least a first subset of the set of uplink resources associated with the first transport block being unused, and transmitting an indication of the first subset of the set of uplink resources that are unused for the first transport block.

An apparatus for wireless communication at a UE is described. The apparatus may include a processor, memory coupled with the processor, and instructions stored in the memory. The instructions may be executable by the processor to cause the apparatus to receive an uplink grant for a set of uplink resources having a first resource allocation size for transmission of at least a first transport block and a second transport block via different transmission layers, encode data to be transmitted via the first transport block and the second transport block, the first transport block having a first transport block size that is different than a second transport block size of the second transport block, and at least the first transport block size is less than the first resource allocation size of the uplink grant associated with the first transport block, transmit the first transport block and the second transport block via the different transmission layers, at least a first subset of the set of uplink resources associated with the first transport block being unused, and transmit an indication of the first subset of the set of uplink resources that are unused for the first transport block.

Another apparatus for wireless communication at a UE is described. The apparatus may include means for receiving an uplink grant for a set of uplink resources having a first resource allocation size for transmission of at least a first transport block and a second transport block via different transmission layers, means for encoding data be transmitted via the first transport block and the second transport block, the first transport block having a first transport block size that is different than a second transport block size of the second transport block, and at least the first transport block size is less than the first resource allocation size of the uplink grant associated with the first transport block, means for transmitting the first transport block and the second transport block via the different transmission layers, at least a first subset of the set of uplink resources associated with the first transport block being unused, and means for transmitting an indication of the first subset of the set of uplink resources that are unused for the first transport block.

A non-transitory computer-readable medium storing code for wireless communication at a UE is described. The code may include instructions executable by a processor to receive an uplink grant for a set of uplink resources having a first resource allocation size for transmission of at least a first transport block and a second transport block via different transmission layers, encode data to be transmitted via the first transport block and the second transport block, the first transport block having a first transport block size that is different than a second transport block size of the second transport block, and at least the first transport block size is less than the first resource allocation size of the uplink grant associated with the first transport block, transmit the first transport block and the second transport block via the different transmission layers, at least a first subset of the set of uplink resources associated with the first transport block being unused, and transmit an indication of the first subset of the set of uplink resources that are unused for the first transport block.

In some examples of the method, apparatuses, and non-transitory computer-readable medium described herein, the second transport block size is smaller than the first transport block size, and the encoding the data to be transmitted may include operations, features, means, or instructions for extending the second transport block to have the first transport block size. In some examples of the method, apparatuses, and non-transitory computer-readable medium described herein, the extending the second transport block may include operations, features, means, or instructions for adding one or more padding bits to the second transport block, or cyclically repeating the second transport block.

In some examples of the method, apparatuses, and non-transitory computer-readable medium described herein, the transmitting the indication may include operations, features, means, or instructions for transmitting uplink control information associated with a configured uplink grant that indicates the first subset of the set of uplink resources, the uplink control information transmitted via one or more of multiplexing with the first transport block or the second transport block, one or more reserved resource elements, or an uplink control channel. Some examples of the method, apparatuses, and non-transitory computer-readable medium described herein may further include operations, features, means, or instructions for determining that a difference between the first transport block size and the first resource allocation size exceeds a threshold value, and where the first subset of the set of uplink resources is unused responsive to the determining. In some examples of the method, apparatuses, and non-transitory computer-readable medium described herein, the threshold value corresponds to a configured percentage of the first resource allocation size.

In some examples of the method, apparatuses, and non-transitory computer-readable medium described herein, the second transport block size is smaller than the first transport block size, and the transmitting the first transport block and the second transport block may include operations, features, means, or instructions for transmitting the second transport block using uplink resources in which a second subset of the set of uplink resources associated with the second transport block is unused, the second subset having a different size than the first subset. In some examples of the method, apparatuses, and non-transitory computer-readable medium described herein, the transmitting the indication may include operations, features, means, or instructions for transmitting an indication of the second subset of the set of uplink resources that are unused for the second transport block.

In some examples of the method, apparatuses, and non-transitory computer-readable medium described herein, where the second transport block size is larger than the first transport block size and corresponds to the first resource allocation size associated with the second transport block, and the first transport block occupies fewer resources than the second transport block. In some examples of the method, apparatuses, and non-transitory computer-readable medium described herein, the second transport block is transmitted using a lower modulation order, a lower coding rate, or both, relative to the first transport block, and occupies a same amount of uplink resources as the first transport block.

Some examples of the method, apparatuses, and non-transitory computer-readable medium described herein may further include operations, features, means, or instructions for receiving a downlink transmission that includes a first downlink transport block and a second downlink transport block that are transmitted via two or more transmission layers, one or more of the first downlink transport block or the second downlink transport block transmitted using fewer resources than a set of downlink resources allocated for the downlink transmission.

In some examples of the method, apparatuses, and non-transitory computer-readable medium described herein, the uplink grant for the set of uplink resources is a dynamic grant for a single set of uplink resources or is a configured grant for a set of multiple sets of uplink resources.

A method for wireless communication at a UE is described. The method may include receiving an uplink grant for at least first uplink resources, the uplink grant having a first resource allocation size, encoding data to be transmitted in the first uplink resources to generate encoded data, the encoded data occupying less than the first resource allocation size, where the UE is configured to skip transmissions in at least a subset of the first uplink resources when encoded data occupies less than all of the first resource allocation size, extending the encoded data to provide extended encoded data when an uplink control information communication is to be transmitted along with the encoded data in the first uplink resource, and transmitting the extended encoded data and the uplink control information communication in the first uplink resources.

An apparatus for wireless communication at a UE is described. The apparatus may include a processor, memory coupled with the processor, and instructions stored in the memory. The instructions may be executable by the processor cause the apparatus to receive an uplink grant for at least first uplink resources, the uplink grant having a first resource allocation size, encode data to be transmitted in the first uplink resources to generate encoded data, the encoded data occupying less than the first resource allocation size, where the UE is configured to skip transmissions in at least a subset of the first uplink resources when encoded data occupies less than all of the first resource allocation size, extend the encoded data to provide extended encoded data when an uplink control information communication is to be transmitted along with the encoded data in the first uplink resource, and transmit the extended encoded data and the uplink control information communication in the first uplink resources.

Another apparatus for wireless communication at a UE is described. The apparatus may include means for receiving an uplink grant for at least first uplink resources, the uplink grant having a first resource allocation size, means for encoding data to be transmitted in the first uplink resources to generate encoded data, the encoded data occupying less than the first resource allocation size, where the UE is configured to skip transmissions in at least a subset of the first uplink resources when encoded data occupies less than all of the first resource allocation size, means for extending the encoded data to provide extended encoded data when an uplink control information communication is to be transmitted along with the encoded data in the first uplink resource, and means for transmitting the extended encoded data and the uplink control information communication in the first uplink resources.

A non-transitory computer-readable medium storing code for wireless communication at a UE is described. The code may include instructions executable by a processor to receive an uplink grant for at least first uplink resources, the uplink grant having a first resource allocation size, encode data to be transmitted in the first uplink resources to generate encoded data, the encoded data occupying less than the first resource allocation size, where the UE is configured to skip transmissions in at least a subset of the first uplink resources when encoded data occupies less than all of the first resource allocation size, extend the encoded data to provide extended encoded data when an uplink control information communication is to be transmitted along with the encoded data in the first uplink resource, and transmit the extended encoded data and the uplink control information communication in the first uplink resources.

In some examples of the method, apparatuses, and non-transitory computer-readable medium described herein, the uplink grant for the first uplink resources is a dynamic grant for physical uplink shared channel resources, and the uplink control information communication provides one or more of channel state information (CSI) or acknowledgment/negative-acknowledgment (ACK/NACK) feedback associated with one or more downlink transmissions.

In some examples of the method, apparatuses, and non-transitory computer-readable medium described herein, the uplink grant for the first uplink resources is a configured grant for a set of multiple periodic sets of physical uplink shared channel resources, and the uplink control information communication provides one or more of CSI or acknowledgment/negative-acknowledgment (ACK/NACK) feedback associated with one or more downlink transmissions.

In some examples of the method, apparatuses, and non-transitory computer-readable medium described herein, the uplink grant for the first uplink resources is a dynamic grant for physical uplink shared channel resources or a configured grant for a set of multiple periodic sets of physical uplink shared channel resources, the uplink control information communication provides one or more of CSI or ACK/NACK feedback associated with one or more downlink transmissions, and the extended coded data occupies an amount of the first uplink resources that corresponds to a size of the uplink control information communication that is multiplexed with the extended coded data.

A method for wireless communication at a network entity is described. The method may include transmitting, to a UE, an uplink grant for a set of uplink resources having a first resource allocation size for transmission of at least a first transport block and a second transport block via different transmission layers of the set of uplink resources, receiving, from the UE, the first transport block and the second transport block via the different transmission layers, at least a first subset of the set of uplink resources associated with the first transport block being unused, and the first transport block having a first transport block size that is different than a second transport block size of the second transport block, and at least the first transport block size is less than the first resource allocation size of the uplink grant associated with the first transport block, and decoding the first transport block and the second transport block based on an indication of the first subset of the set of uplink resources that are unused for the first transport block.

An apparatus for wireless communication at a network entity is described. The apparatus may include a processor, memory coupled with the processor, and instructions stored in the memory. The instructions may be executable by the processor to cause the apparatus to transmit, to a UE, an uplink grant for a set of uplink resources having a first resource allocation size for transmission of at least a first transport block and a second transport block via different transmission layers of the set of uplink resources, receive, from the UE, the first transport block and the second transport block via the different transmission layers, at least a first subset of the set of uplink resources associated with the first transport block being unused, and the first transport block having a first transport block size that is different than a second transport block size of the second transport block, and at least the first transport block size is less than the first resource allocation size of the uplink grant associated with the first transport block, and decode the first transport block and the second transport block based on an indication of the first subset of the set of uplink resources that are unused for the first transport block.

Another apparatus for wireless communication at a network entity is described. The apparatus may include means for transmitting, to a UE, an uplink grant for a set of uplink resources having a first resource allocation size for transmission of at least a first transport block and a second transport block via different transmission layers of the set of uplink resources, means for receiving, from the UE, the first transport block and the second transport block via the different transmission layers, at least a first subset of the set of uplink resources associated with the first transport block being unused, and the first transport block having a first transport block size that is different than a second transport block size of the second transport block, and at least the first transport block size is less than the first resource allocation size of the uplink grant associated with the first transport block, and means for decoding the first transport block and the second transport block based on an indication of the first subset of the set of uplink resources that are unused for the first transport block.

A non-transitory computer-readable medium storing code for wireless communication at a network entity is described. The code may include instructions executable by a processor to transmit, to a UE, an uplink grant for a set of uplink resources having a first resource allocation size for transmission of at least a first transport block and a second transport block via different transmission layers of the set of uplink resources, receive, from the UE, the first transport block and the second transport block via the different transmission layers, at least a first subset of the set of uplink resources associated with the first transport block being unused, and the first transport block having a first transport block size that is different than a second transport block size of the second transport block, and at least the first transport block size is less than the first resource allocation size of the uplink grant associated with the first transport block, and decode the first transport block and the second transport block based on an indication of the first subset of the set of uplink resources that are unused for the first transport block.

In some examples of the method, apparatuses, and non-transitory computer-readable medium described herein, the second transport block size is smaller than the first transport block size, and the encoding the data to be transmitted may include operations, features, means, or instructions for extending the second transport block to have the first transport block size. Some examples of the method, apparatuses, and non-transitory computer-readable medium described herein may further include operations, features, means, or instructions for receiving, from the UE, uplink control information that includes the indication of the first subset of the set of uplink resources, the uplink control information transmitted via one or more of multiplexing with the first transport block or the second transport block, one or more reserved resource elements, or an uplink control channel.

Some examples of the method, apparatuses, and non-transitory computer-readable medium described herein may further include operations, features, means, or instructions for configuring the UE with a threshold value for skipping transmissions in the first subset of the set of uplink resources, the threshold value corresponding to percentage of the first resource allocation size. In some examples of the method, apparatuses, and non-transitory computer-readable medium described herein, where the second transport block size is larger than the first transport block size and corresponds to the first resource allocation size associated with the second transport block, and the first transport block occupies fewer resources than the second transport block.

Some examples of the method, apparatuses, and non-transitory computer-readable medium described herein may further include operations, features, means, or instructions for transmitting, to the UE, a downlink transmission that includes a first downlink transport block and a second downlink transport block that are transmitted via two or more transmission layers, one or more of the first downlink transport block or the second downlink transport block transmitted using fewer resources than a set of downlink resources allocated for the downlink transmission.

DETAILED DESCRIPTION

Figure 1:
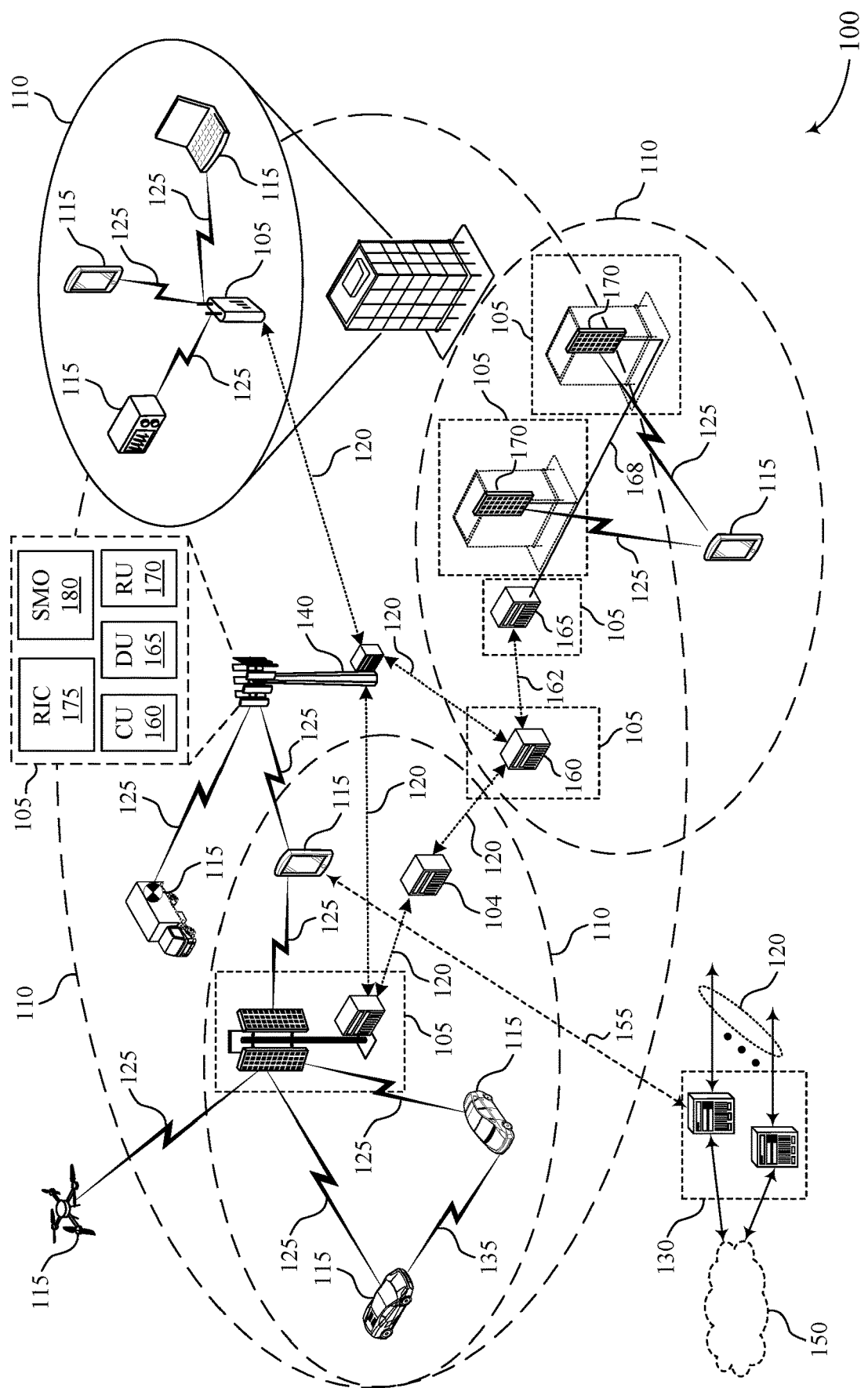
FIG. 1 illustrates an example of a wireless communications system that supports partial uplink transmission for multiple uplink transport blocks in accordance with one or more aspects of the present disclosure.

In some wireless communications systems, a user equipment (UE) may transmit data to a network entity using preconfigured time and frequency resources. For example, the UE may receive an indication of a configured grant, such as a configured grant physical uplink shared channel (PUSCH), and may transmit data to the network entity in accordance with the configured grant based on one or both of a configuration or activation of the configured grant. One use case in which configured grants may be useful is when traffic is generated in a periodic or quasi-periodic manner (e.g., in extended reality (XR) applications), where configured grants may substantially enhance efficiency because a buffer status report and scheduling request are not sent by a UE, and related dynamic grants is not transmitted by the network entity. However, if the UE uses less than all of the configured resources, this can increase UE power consumption because the uplink transmission may be extended to fill the allocated resources (e.g., by adding padding bits).

In accordance with various aspects as discussed herein, an uplink grant may provide resources for multiple transport blocks, which may be transmitted via multiple transmission layers. Such grants may thus allow for larger quantities of data to be transmitted, which may result in a higher likelihood that uplink data to be transmitted will occupy less than all of the allocated resources. Further, transmissions on multiple transmission layers may further increase UE power consumption, and adding padding bits to uplink transmissions in such cases may add to the increased power consumption.

In some cases, when transmitting two or more transport blocks in an uplink transmission, a UE may skip transmissions in some portion of a set of allocated resources. For example, uplink resources for two transport blocks may be allocated to a UE, where different transport blocks may carry different logical channels, and thus data from one transport block may not simply be transmitted in the other transport block. Further, one or both of the transport blocks to be transmitted by the UE may have a transport block size that is less than a size of the allocated uplink resources. In accordance with various aspects, the UE may skip uplink resources corresponding to a difference between the allocated resources and the larger of the two transport blocks, and the smaller transport block may be extended to use the resources that the larger transport block. Based on the skipping of some uplink resources, the UE may transmit an indication which of the uplink resources are skipped (e.g., an indication of one or more orthogonal frequency division multiplexing (OFDM) symbols, one or more resource blocks (RBs), one or more resource elements (REs), or any combinations thereof). In some cases, the network entity may configure the UE with a threshold value such that if the number of resources (e.g., number of RBs, REs, or OFDM symbols) that are to be skipped when transmitting the two transport blocks is less than the threshold value, then the UE does not skip the resources (e.g., padding bits are added to occupy the full resource allocation).

In some cases, each transport block may carry traffic from the same traffic channels. In such cases, a first transport block may be filled to occupy the full set of resources and a second transport block may be partially filled, and the UE may skip a portion of the associated uplink resources. While various examples discussed herein discuss uplink configured grants, the techniques provided herein may also be used for downlink grants (e.g., downlink semi-persistent scheduling (SPS) communications), as well as for dynamic uplink grants. Additionally, or alternatively, in some cases where uplink resources also include physical uplink control channel (PUCCH) information, skipping on portions of the uplink resources may not be allowed (e.g., due to decoding of the multiplexed PUCCH/PUSCH), and padding is provided for transport blocks in such cases in order to occupy the allocated uplink resources.

Particular implementations of the subject matter described in this disclosure can be implemented to realize one or more of the following potential advantages. For example, as a result of supporting multiple transport block transmissions in which portions of uplink resources may be skipped or unused, a UE may operate with reduced power consumption. As such, the UE may consume less battery power and achieve greater power savings, which may increase a battery life of the UE, while also supporting lower latency communication and lower overhead through use of configured grants. As such, the UE and the network entity may achieve higher data rates, greater spectral efficiency, and greater system capacity, while mitigating additional UE power consumption that may be associated with padding of uplink transport block transmissions.

Aspects of the disclosure are initially described in the context of wireless communications systems. Aspects of the disclosure are further illustrated by and described with reference to resource diagrams, process flows, apparatus diagrams, system diagrams, and flowcharts that relate to partial uplink transmission for multiple uplink transport blocks.

FIG. 1 illustrates an example of a wireless communications system 100 that supports partial uplink transmission for multiple uplink transport blocks in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support partial uplink transmission for multiple uplink transport blocks as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some cases, a UE 115 may concurrently transmit two or more transport blocks in an uplink transmission, via two or more transport layers. In accordance with various techniques discussed herein, such a UE 115 may skip transmissions in some portion of a set of allocated resources for one or more of the transport blocks. In some cases, an uplink grant may provide the set of uplink resources for two or more transport blocks via different transmission layers. Uplink data may be encoded to be transmitted via the multiple transport blocks, where a first transport block may have first transport block size that is different than a second transport block size of a second transport block. Further, the transport block sizes may be less than a size of the set of allocated resources. In some cases, the first transport block and the second transport block may be transmitted via the different transmission layers, and a portion of the allocated uplink resources may be unused. The transmitting device may provide an indication of the unused resources for use in decoding the transport blocks.

Figure 2:
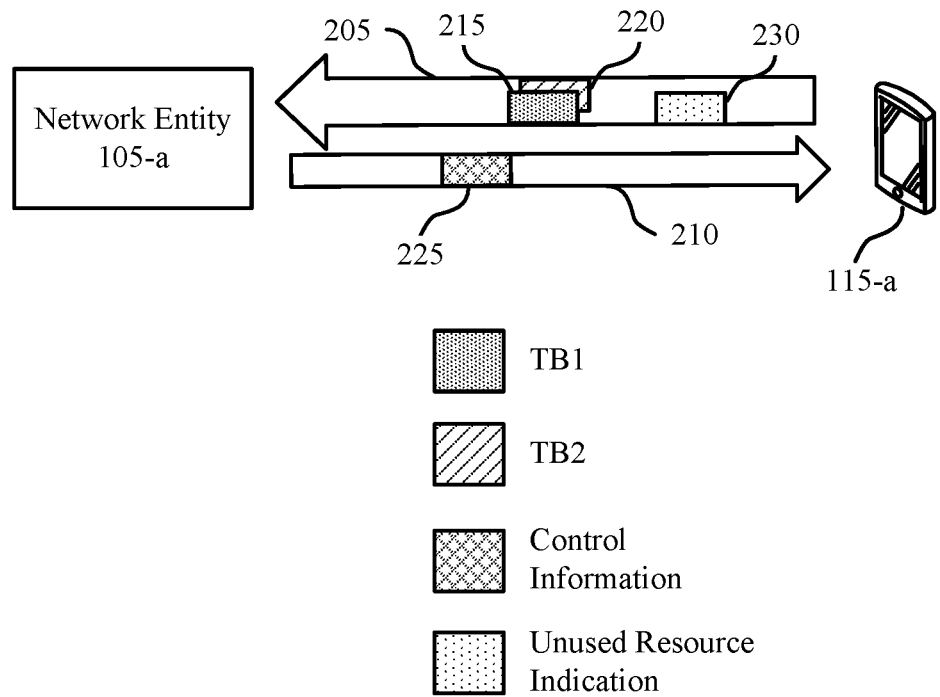
FIG. 2 illustrates an example of a wireless communications system that supports partial uplink transmission for multiple uplink transport blocks in accordance with one or more aspects of the present disclosure.

FIG. 2 illustrates an example of a wireless communications system 200 that supports partial uplink transmission for multiple uplink transport blocks in accordance with one or more aspects of the present disclosure. In some examples, the wireless communications system 200 may implement aspects of wireless communications system 100. For example, the wireless communications system 200 may include a network entity 105-a and a UE 115-a, which may be examples of the corresponding devices of FIG. 1. The UE 115-a and the network entity 105-a may communicate via one or more uplink carriers 205 and one or more downlink carriers 210 (e.g., using frequency division multiplexing or time division multiplexing of uplink and downlink communications).

In the example, of FIG. 2, the UE 115-a may transmit multiple transport blocks, including a first transport block 215 (TB1) and a second transport block 220 (TB2) via uplink carrier 205. In some cases, the network entity 105-a may provide a resource allocation for such uplink communications, such as via control information 225 that may provide a configured grant for periodic uplink resources. The uplink grant may be provided for multiple transport blocks, including the first transport block 215 and the second transport block 220, via two or more transmission layers (e.g., two transport blocks may be transmitted via a 4-layer transmission). In accordance with various aspects discussed herein, the UE 115-a may use less than all available uplink resources for transmission of one or more of the first transport block 215 or the second transport block 220. In such cases, the UE 115-a may provide an unused resource indication 230 that may be used at the network entity 105-a for decoding the first transport block 215 and the second transport block 220.

As discussed herein, configured uplink grants may provide for efficient allocation of periodic or quasi-periodic uplink communications, such as traffic generated by an XR application (e.g., for uplink XR video data transmission). When compared to dynamic grants, configured grants may reduce the overhead of a scheduling transmission (e.g., downlink control information (DCI) with an associated resource allocation). Moreover, when using a configured grant, the UE 115-a does not need to transmit scheduling request (SR), monitor a downlink control channel for an uplink grant, or transmit a buffer status report (BSR), associated with an uplink transmission. As such, configured grants may reduce latency and allow uplink data transmission that can meet packet delay budget (PDB) targets. However, the configuration of resource allocation of a configured grant CG is semi-static (e.g., via RRC signaling), and thus a configured grant configuration may not be able to adapt quickly to changes in an amount of uplink traffic. In order to accommodate expected uplink traffic, in some cases a configured grant resource allocation may be overallocated in order to accommodate expected uplink transmissions. Further, as discussed herein, in some cases multiple transport blocks may be transmitted via multiple transmission layers. Such multiple transport block transmissions may enhance uplink configured grant, and downlink semi-persistent scheduling, by allowing the PUSCH/PDSCH to transmit more than one TB (for example 2 TBs), and in some cases, for uplink MIMO, four or more transmission layers may be enabled for PUSCH which may result in transmission of two transport blocks. In accordance with various techniques discussed herein, UE 115-a may transmit using partial uplink resources for one or more transport block resources, using a subset of allocated uplink resources to provide for transmission of the transport blocks without a substantial amount of padding.

In some cases, different transport blocks may be subject to different restrictions (e.g., some logical channel may transmit the first transport block 215 but not the second transport block 220). In such cases, data from one transport block is not able to be simply transmitted using the other transport block, and thus the different transport blocks may have different sizes. Further, in some cases neither of the transport blocks may occupy the full set of uplink resources. In other cases, different transport blocks may not be subject to different restrictions, but data at the UE 115-a may occupy more than one transport block, but is not sufficient to fill both transport blocks.

Figure 3:
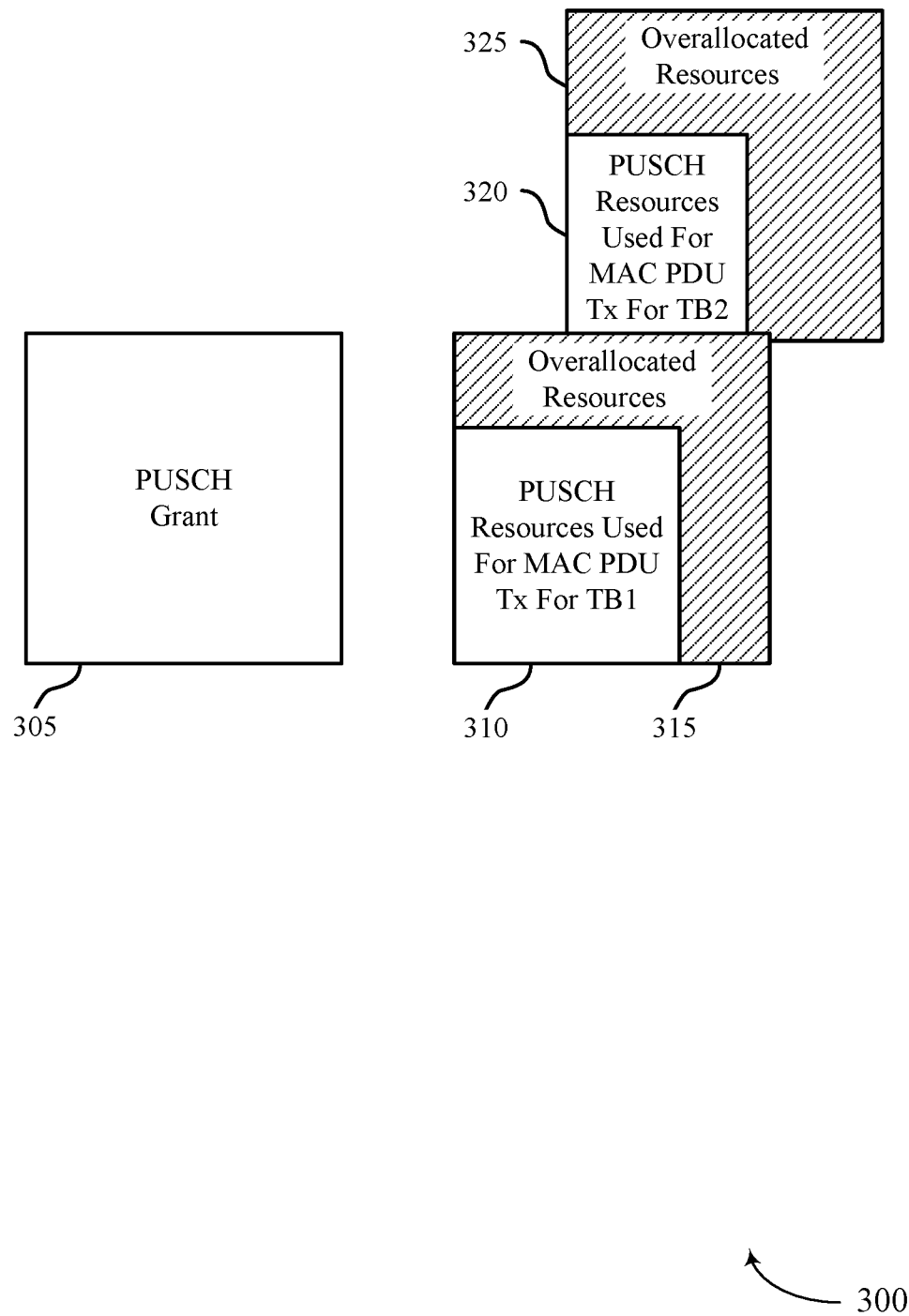
FIG. 3 illustrates an example of granted resources and overallocated resources for transport blocks that support partial uplink transmission for multiple uplink transport blocks in accordance with one or more aspects of the present disclosure.

FIG. 3 illustrates an example of a granted resources and overallocated resources for transport blocks 300 that supports partial uplink transmission for multiple uplink transport blocks in accordance with one or more aspects of the present disclosure. The granted resources and overallocated resources for transport blocks 300 may implement or be implemented to realize aspects of the wireless communications system 100 or the wireless communications system 200. For example, a UE 115 and a network entity 105, which may be examples of corresponding devices as illustrated by and described with reference to FIGS. 1 and 2, may communicate based on the granted resources and overallocated resources for transport blocks 300 in accordance with techniques as discussed herein.

In the example of FIG. 3, a PUSCH grant 305 may provide a set of allocated resources for multiple transport blocks. A UE may obtain data to be transmitted via the set of allocated resources (e.g., one or more MAC PDUs that include XR application data). In this example, a PUSCH resource for a first transport block 310 may occupy less than the available set of allocated resources, and thus a first subset of overallocated resources 315 is present. Further, in this example, a PUSCH resource for a second transport block 320 may occupy less than the available set of allocated resources, and thus a second subset of overallocated resources 325 is present. As discussed, in some cases data from one transport block may have logical channel restrictions that prevent data from different transport blocks from being combined.

In some cases, when the first transport block is to be transmitted via different logical channels than the second transport block, and if the first transport block has a transport block size that is smaller than a transport block size of the second transport block, and if both transport blocks require less resources than in the allocated set of uplink resources, the UE 115-a may skip transmissions in a portion of the uplink resources such that the larger of the two transport blocks is transmitted. In such cases, the smaller transport block may be extended to use the same amount of resources that the larger transport block utilizes.

In the example of FIG. 3, the PUSCH resource for a first transport block 310 may occupy more resources than the PUSCH resource for a second transport block 320. Thus, in this example, the second transport block may be extended such that the extended transport block occupies resources that correspond to the PUSCH resource for a first transport block 310. In some cases, padding bits may be added to the smaller transport block to extend its size to be equal to the size of the larger transport block. Then, both transport blocks may be transmitted using a number of resource blocks that is less than an allocated set of uplink resource blocks. In some cases, the transmitting UE may provide an unused resource indication that describes which of the resources are skipped (e.g., one or more skipped OFDM symbols, RBs, REs, a number of resources, or any combinations thereof), which may correspond to the first subset of overallocated resources 315. Additionally, or alternatively, the smaller transport block may be repeated cyclically such that the size of the cyclically repeated transport block corresponds to the size of the larger transport block (e.g., which may increase the reliability of the transmission of the smaller transport block). In some cases, the unused resource indication may be provided in separate uplink control information (UCI). For example, the unused resource indication may be transmitted or multiplexed with either the first transport block, or the second transport block, may be transmitted using reserved REs, or provided on a separate PUCCH. In some cases, the UCI may be appended to HARQ acknowledgment/negative-acknowledgment (ACK/NACK) bits, and may be jointly encoded with the ACK/NACK bits. The jointly encoded information may be rate matched or punctured and mapped to the REs.

In some cases, the network entity may configure the UE with a threshold value such that if the number of resources (e.g., number of RBs, number of OFDM symbols) that are to be skipped when transmitting the two transport blocks is less than the threshold value, then the UE does not skip the resources. In such cases, the additional transmission power associated with the transmission of the unused resource indication to indicate the skipped resources may be equivalent to or larger than the power to transmit extended transport blocks that occupy the full PUSCH grant 305, and thus power may not be substantially reduced through skipping resources. In some cases, the threshold value is set based on an amount of power associated with the unused resource indication and an amount of power associated with transmission of RBs using multiple transmission layers. In some cases, an adaptive threshold may be provided. For example, the UE may be configured to skip transmission on overallocated resources if greater than x % of resources are skipped for the transmission of the two transport blocks. In some cases, the threshold value may be configured via RRC signaling, DCI, a MAC-CE, or any combinations thereof, or via any L1/L2/L3 signaling that may be defined to provide such information.

Figure 4:
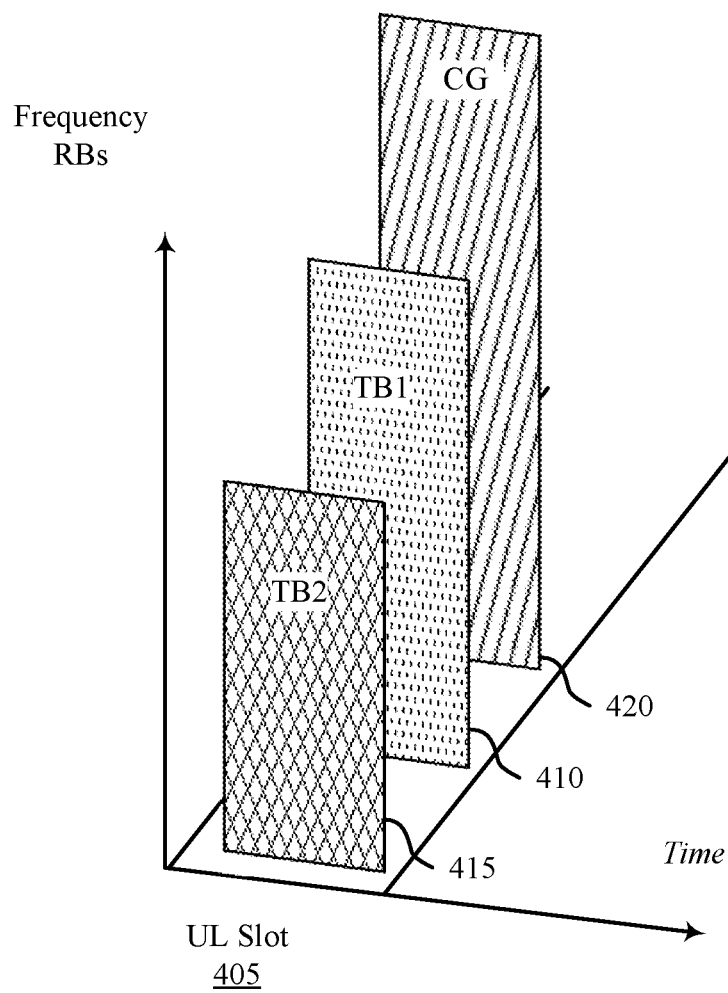
FIG. 4 illustrates an example of transport block resources in transmission layers that support partial uplink transmission for multiple uplink transport blocks in accordance with one or more aspects of the present disclosure.

FIG. 4 illustrates an example of transport block resources in transmission layers 400 that support partial uplink transmission for multiple uplink transport blocks in accordance with one or more aspects of the present disclosure. The transport block resources in transmission layers 400 may implement or be implemented to realize aspects of the wireless communications system 100 or the wireless communications system 200. For example, a UE 115 and a network entity 105, which may be examples of corresponding devices as illustrated by and described with reference to FIGS. 1 and 2, may communicate based on the transport block resources in transmission layers 400 in accordance with techniques as discussed herein.

In the example of FIG. 4, an uplink slot 405 may be used to transmit multiple transport blocks using multiple transmission layers. In this example, configured grant resources 420 may occupy a set of resources associated with each transmission layer. In this example, a first transport block 410 may occupy a second set of resources associated with one or more transmission layers, and a second transport block 415 may occupy a third set of resources associated with one or more transmission layers. As discussed herein, in some cases different transport blocks may be subject to different restrictions (e.g., some logical channels may transmit the first transport block 410 but not the second transport block 415). Further, in this example, a size of the second transport block 415 is less than the size of the first transport block 410, and both transport blocks use less resources than allocated in the configured grant resources 420. In some cases, the transmitting UE may skip transmissions in the delta resources between the two transport blocks. Such transmissions are similar to puncturing for the second transport block 415 the resources that been utilized for transmission of the first transport block 410, and may be useful for detection of the first transport block 410 as inter-layer interference may be reduced. In such cases, the unused resource indication may include differential information of skipped resources to indicate the puncturing.

In other cases, different transport blocks are not subject to different restrictions in such cases uplink data may not be sufficient to fill both transport blocks, but the data fits into more than one transport block. In some cases, in such situations the UE may transmit a full transport block on one of the transport blocks, and may transmit a partial transport block on another of the transport blocks. In such cases, the UE may transmit an unused resource indication, or alternatively may transmit an indication of utilized resources of the partial transport block (e.g., a number of RBs, OFDM symbols, REs, or any combinations thereof). Such an indication of used or unused resource may be transmitted on PUCCH or PUSCH, such as with the full transport block.

In further aspects, additionally or alternatively, instead of skipping resources in the uplink grant for reduced power consumption, the UE may utilize a lower modulation and coding scheme (MCS) while using the same number of RBs, which may reduce power consumption of transmission of the transport block. In some cases, the UE may provide an indication (e.g., via UCI) that provides MCSs used for each transport block. In still further aspects, additionally or alternatively, techniques as discussed herein may be used for downlink communications, such as SPS that may transmit two transport blocks. In such cases, the network entity may optimally use the skipped resources for transmission of downlink transport blocks. In some cases, a modified downlink preemption indication or skipping indication can be used to indicate the skipping for each downlink transport block. Further, in some cases, techniques as discussed herein may also be used for dynamic grants. For example, a dynamic grant overallocation may be present based on a range associated with a single BSR code point (e.g. the maximum range is ~7 or 8 MB), and overallocated resources may be skipped in accordance with various techniques discussed herein.

In some aspects, a UE may transmit uplink control information (UCI) in an uplink transmission that uses one or more transport blocks. For example, the UE may transmit channel state information (CSI), feedback information (e.g., HARQ ACK/NACK feedback), and the like. Such UCI may be transmitted using different modulation and coding as PUSCH data. In some cases, to avoid existing UCI decoding being affected by partial uplink skipping, uplink transmissions on dynamic scheduled PUSCH with overlapping UCI with CSI or ACK/NACK feedback on PUCCH may not be partially skipped. Further, uplink transmission on configured scheduled PUSCH (e.g., configured grant uplink) with overlapping CSI or ACK/NACK feedback on PUCCH may not be partially skipped. Further, uplink transmission on dynamic or configured PUSCH may be partially skipped while ensuring the overlapping CSI or ACK/NACK feedback transmission remains unchanged and in a location that is expected by the receiving network entity.

In some aspects, additionally or alternatively, a UE may transmit an unused resource indication, or an indication of utilized resources of one or more partial transport blocks (e.g., a number of RBs, OFDM symbols, REs, or any combinations thereof), for each configured grant PUSCH transmission. For example, configured grant resources may provide UCI resources, and the configured grant UCI may have one or more fields that indicate RB skipping for one or more TBs.

In some further aspects, additionally or alternatively, a UE may transmit an indication that one or more TBs are skipped. For example, one or more TBs may be skipped entirely if unnecessary for transmission of uplink data. In some cases, a skipping indication may indicate that one TB is skipped (e.g., on one transmission layer), or may indicate that two TBs are skipped (e.g., on two transmission layers or two consecutive TBs on a same transmission layer), for example, Further, in some cases the skipping indication may indicate skipping of a TB of a PUSCH that does not include multiplexed UCI (e.g., a PUSCH with a multiplexed a UCI configured grant is not skipped).

Figure 5:
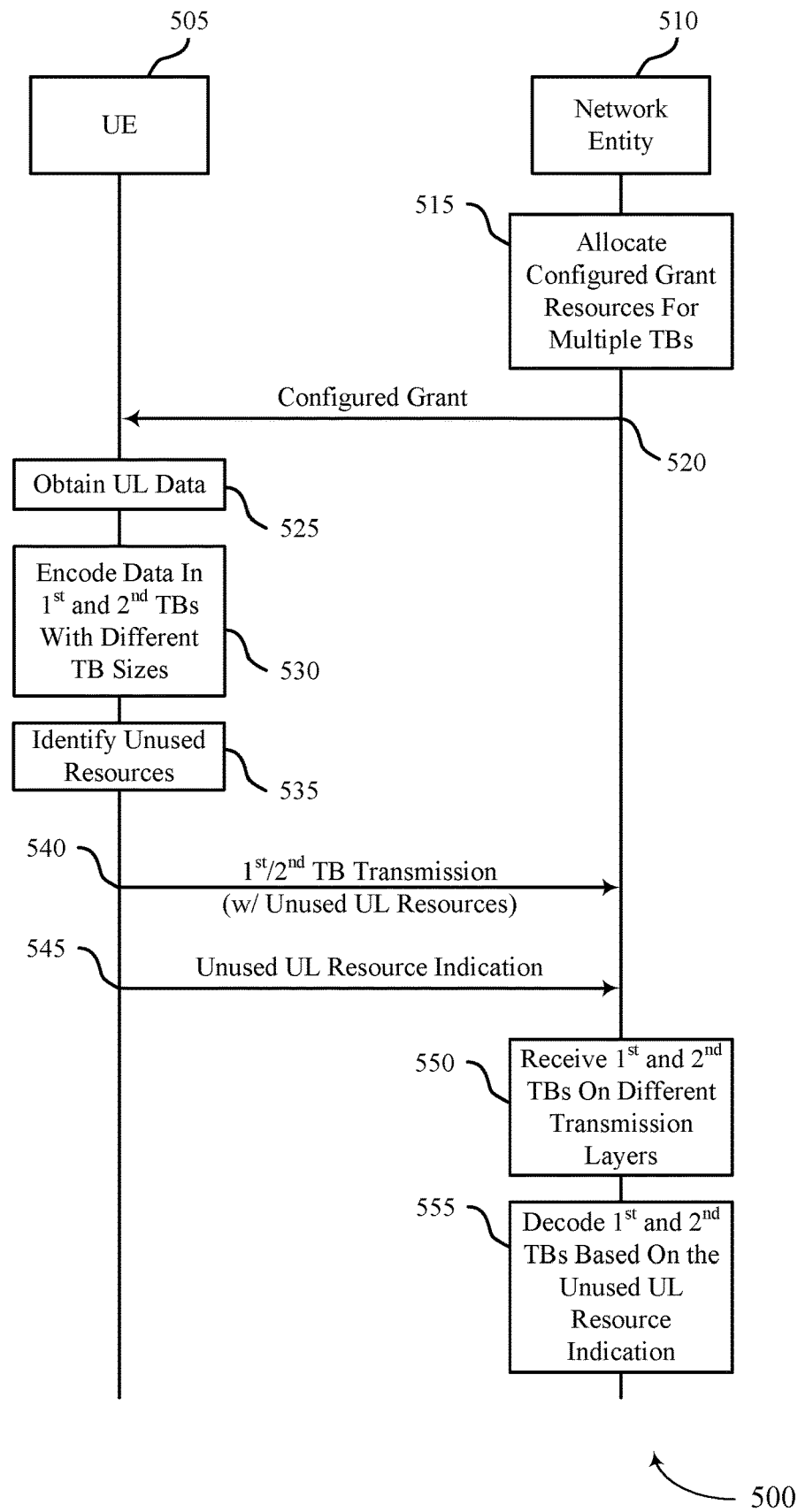
FIG. 5 illustrates an example of a process flow that supports partial uplink transmission for multiple uplink transport blocks in accordance with one or more aspects of the present disclosure.

FIG. 5 illustrates an example of a process flow 500 that supports partial uplink transmission for multiple uplink transport blocks in accordance with one or more aspects of the present disclosure. The process flow 500 may implement or be implemented by aspects of the wireless communications system 100, the wireless communications system 200, the granted resources and overallocated resources for transport blocks 300, or the transport block resources in transmission layers 400. For example, the process flow 500 illustrates communication between a UE 505 and a network entity 510, which may be examples of corresponding devices as illustrated by and described with reference to FIGS. 1 and 2. In some implementations, the UE 505 and the network entity 510 may support partial uplink skipping of configured grant resources for multiple transport blocks.

In the following description of the process flow 500, the operations may be performed (such as reported or provided) in a different order than the order shown, or the operations performed by the example devices may be performed in different orders or at different times. Some operations also may be left out of the process flow 500, or other operations may be added to the process flow 500. Further, although some operations or signaling may be shown to occur at different times for discussion purposes, these operations may actually occur at the same time.

At 515, the network entity 510 may allocate configured grant resources for multiple transport blocks. In some cases, the allocation of the configured grant resources may be provided to accommodate periodic or quasi-periodic uplink transmissions of the UE 505, such that uplink transmissions may be provided with reduced overhead. At 520, the network entity 510 may transmit, and the UE 505 may receive, configuration information for the configured grant. In some cases, the network entity 510 may transmit signaling that enables or activated the configured grant, which may be provided with configured grant information or in a separate communication.

At 525, the UE 505 may obtain uplink data that is to be transmitted using the configured grant resources. In some cases, the uplink data may be periodically reported or transmitted data (e.g., real-time data that is transmitted in accordance with a frame rate that is supported by the configured grant resources).

At 530, the UE 505 may encode data in a first transport block and a second transport block, and the transport blocks may have different transport block sizes. In some cases, the UE 505 may encode data in the different transport blocks in accordance with logical channel restrictions on the transport blocks, such that data from one transport block may not be able to be transmitted on the other transport block. At 535, the UE 505 may identify unused resources for one or both transport blocks. As discussed herein, in some cases, the UE 505 may identify a number of ODFM symbols, a number of RBs, a number of REs, or any combinations thereof, that may be skipped in the configured grant resources for one or more of the transport blocks.

At 540, the UE 505 may transmit the first transport block and the second transport block, where the transmission of the transport blocks may be concurrent using multiple transport layers associated with the configured grant. In accordance with techniques discussed herein, the UE 505 may skip a subset of a set of allocated uplink resources of the configured for one or more of the transport blocks. At 545, the UE 505 may transmit an unused uplink resource indication, that identifies the skipped uplink resources.

At 550, the network entity 510 may receive the first and second transport blocks on different transmission layers of the set of configured grant resources. At 555, the network entity 510 may decode the first transport block and the second transport block based on the unused resource indication. As discussed herein, the unused resource indication may include a number of OFDM symbols, RBs, REs, or any combinations thereof, that were skipped, and the network entity 510 may use this information to decode using the occupied resources.

Figure 6:
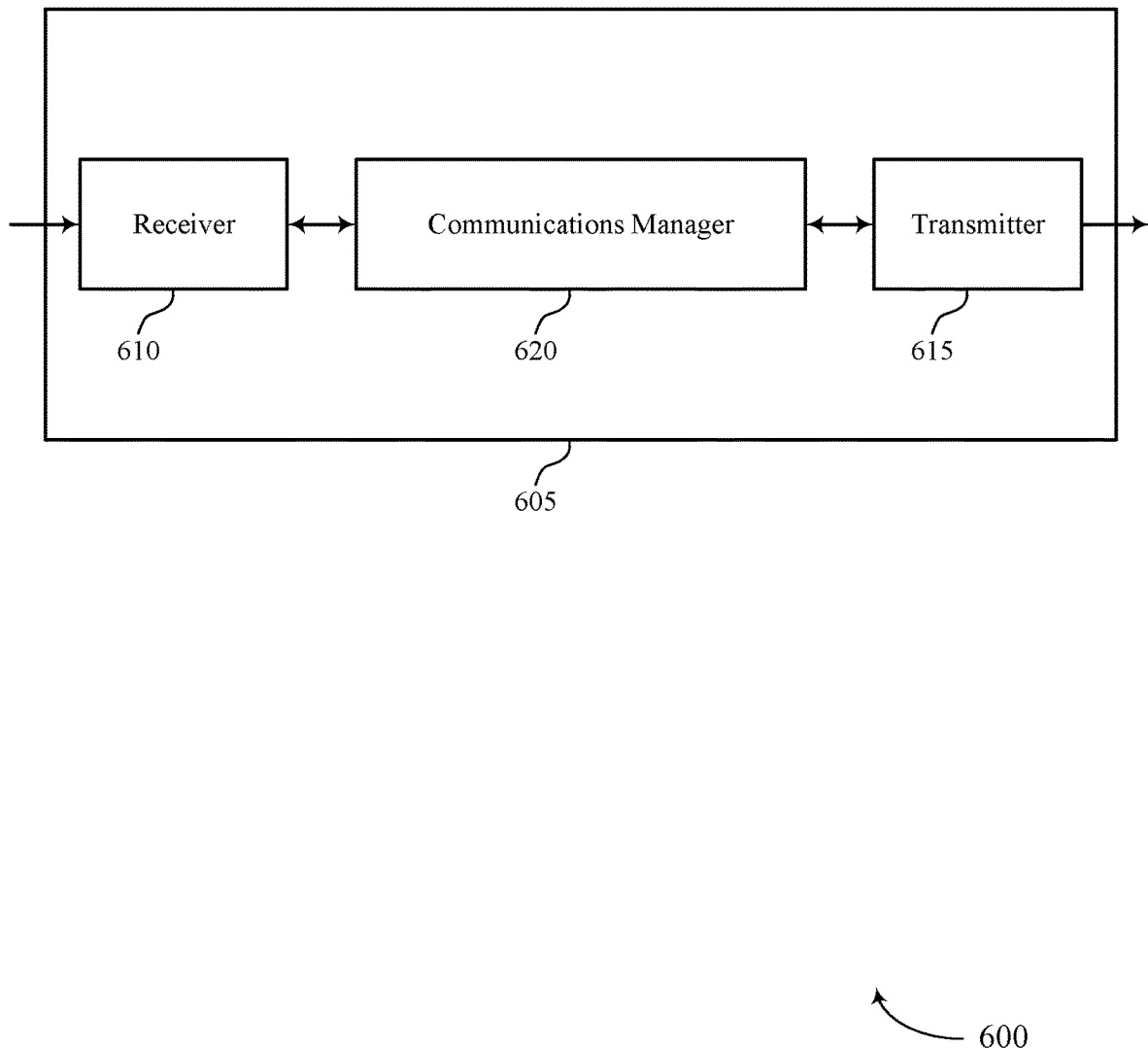
FIGS. 6 and 7 illustrate block diagrams of devices that support partial uplink transmission for multiple uplink transport blocks in accordance with one or more aspects of the present disclosure.

FIG. 6 illustrates a block diagram 600 of a device 605 that supports partial uplink transmission for multiple uplink transport blocks in accordance with one or more aspects of the present disclosure. The device 605 may be an example of aspects of a UE 115 as described herein. The device 605 may include a receiver 610, a transmitter 615, and a communications manager 620. The device 605 may also include one or more processors, memory coupled with the one or more processors, and instructions stored in the memory that are executable by the one or more processors to enable the one or more processors to perform partial uplink transmission for multiple transport blocks discussed herein. Each of these components may be in communication with each other (e.g., via one or more buses).

The receiver 610 may provide a means for receiving information such as packets, user data, control information, or any combination thereof associated with various information channels (e.g., control channels, data channels, information channels related to partial uplink transmission for multiple uplink transport blocks). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to partial uplink transmission for multiple uplink transport blocks). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of partial uplink transmission for multiple uplink transport blocks as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for receiving an uplink grant for a set of uplink resources having a first resource allocation size for transmission of at least a first transport block and a second transport block via different transmission layers. The communications manager 620 may be configured as or otherwise support a means for encoding data to be transmitted via the first transport block and the second transport block, the first transport block having a first transport block size that is different than a second transport block size of the second transport block, and at least the first transport block size is less than the first resource allocation size of the uplink grant associated with the first transport block. The communications manager 620 may be configured as or otherwise support a means for transmitting the first transport block and the second transport block via the different transmission layers, at least a first subset of the set of uplink resources associated with the first transport block being unused. The communications manager 620 may be configured as or otherwise support a means for transmitting an indication of the first subset of the set of uplink resources that are unused for the first transport block.

Additionally, or alternatively, the communications manager 620 may support wireless communication at a UE in accordance with examples as disclosed herein. For example, the communications manager 620 may be configured as or otherwise support a means for receiving an uplink grant for at least first uplink resources, the uplink grant having a first resource allocation size. The communications manager 620 may be configured as or otherwise support a means for encoding data to be transmitted in the first uplink resources to generate encoded data, the encoded data occupying less than the first resource allocation size, where the UE is configured to skip transmissions in at least a subset of the first uplink resources when encoded data occupies less than all of the first resource allocation size. The communications manager 620 may be configured as or otherwise support a means for extending the encoded data to provide extended encoded data when an uplink control information communication is to be transmitted along with the encoded data in the first uplink resource. The communications manager 620 may be configured as or otherwise support a means for transmitting the extended encoded data and the uplink control information communication in the first uplink resources.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for uplink transmissions via multiple concurrent transport blocks with reduced power consumption, and more efficient utilization of communication resources.

Figure 7:
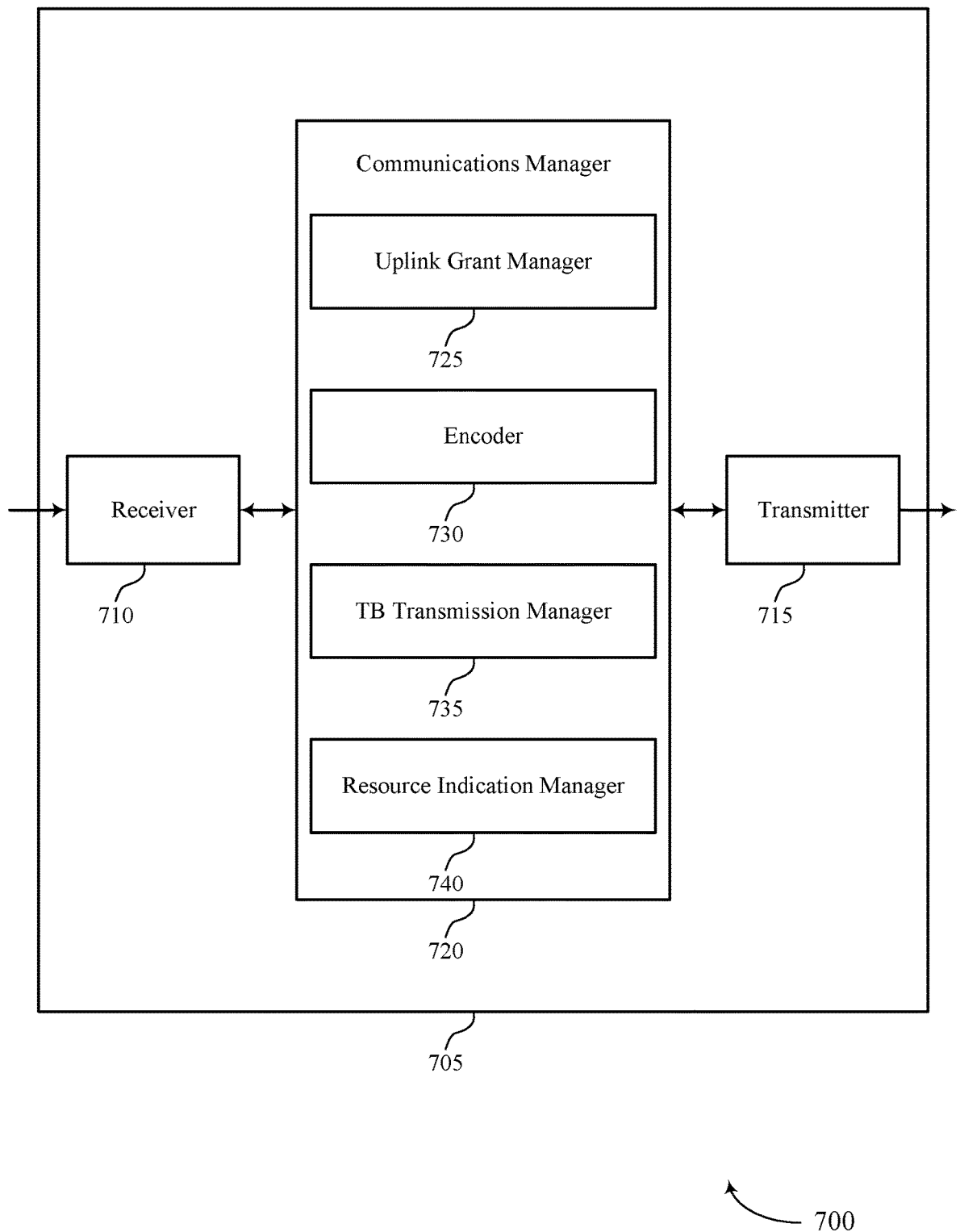

FIG. 7 illustrates a block diagram 700 of a device 705 that supports partial uplink transmission for multiple uplink transport blocks in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to partial uplink transmission for multiple uplink transport blocks). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to partial uplink transmission for multiple uplink transport blocks). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of partial uplink transmission for multiple uplink transport blocks as described herein. For example, the communications manager 720 may include an uplink grant manager 725, an encoder 730, a TB transmission manager 735, a resource indication manager 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The uplink grant manager 725 may be configured as or otherwise support a means for receiving an uplink grant for a set of uplink resources having a first resource allocation size for transmission of at least a first transport block and a second transport block via different transmission layers. The encoder 730 may be configured as or otherwise support a means for encoding data to be transmitted via the first transport block and the second transport block, the first transport block having a first transport block size that is different than a second transport block size of the second transport block, and at least the first transport block size is less than the first resource allocation size of the uplink grant associated with the first transport block. The TB transmission manager 735 may be configured as or otherwise support a means for transmitting the first transport block and the second transport block via the different transmission layers, at least a first subset of the set of uplink resources associated with the first transport block being unused. The resource indication manager 740 may be configured as or otherwise support a means for transmitting an indication of the first subset of the set of uplink resources that are unused for the first transport block.

Additionally, or alternatively, the communications manager 720 may support wireless communication at a UE in accordance with examples as disclosed herein. The uplink grant manager 725 may be configured as or otherwise support a means for receiving an uplink grant for at least first uplink resources, the uplink grant having a first resource allocation size. The encoder 730 may be configured as or otherwise support a means for encoding data to be transmitted in the first uplink resources to generate encoded data, the encoded data occupying less than the first resource allocation size, where the UE is configured to skip transmissions in at least a subset of the first uplink resources when encoded data occupies less than all of the first resource allocation size. The TB transmission manager 735 may be configured as or otherwise support a means for extending the encoded data to provide extended encoded data when an uplink control information communication is to be transmitted along with the encoded data in the first uplink resource. The TB transmission manager 735 may be configured as or otherwise support a means for transmitting the extended encoded data and the uplink control information communication in the first uplink resources.

In some cases, the uplink grant manager 725, encoder 730, TB transmission manager 735, and resource indication manager 740 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the uplink grant manager 725, encoder 730, TB transmission manager 735, and resource indication manager 740 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 8:
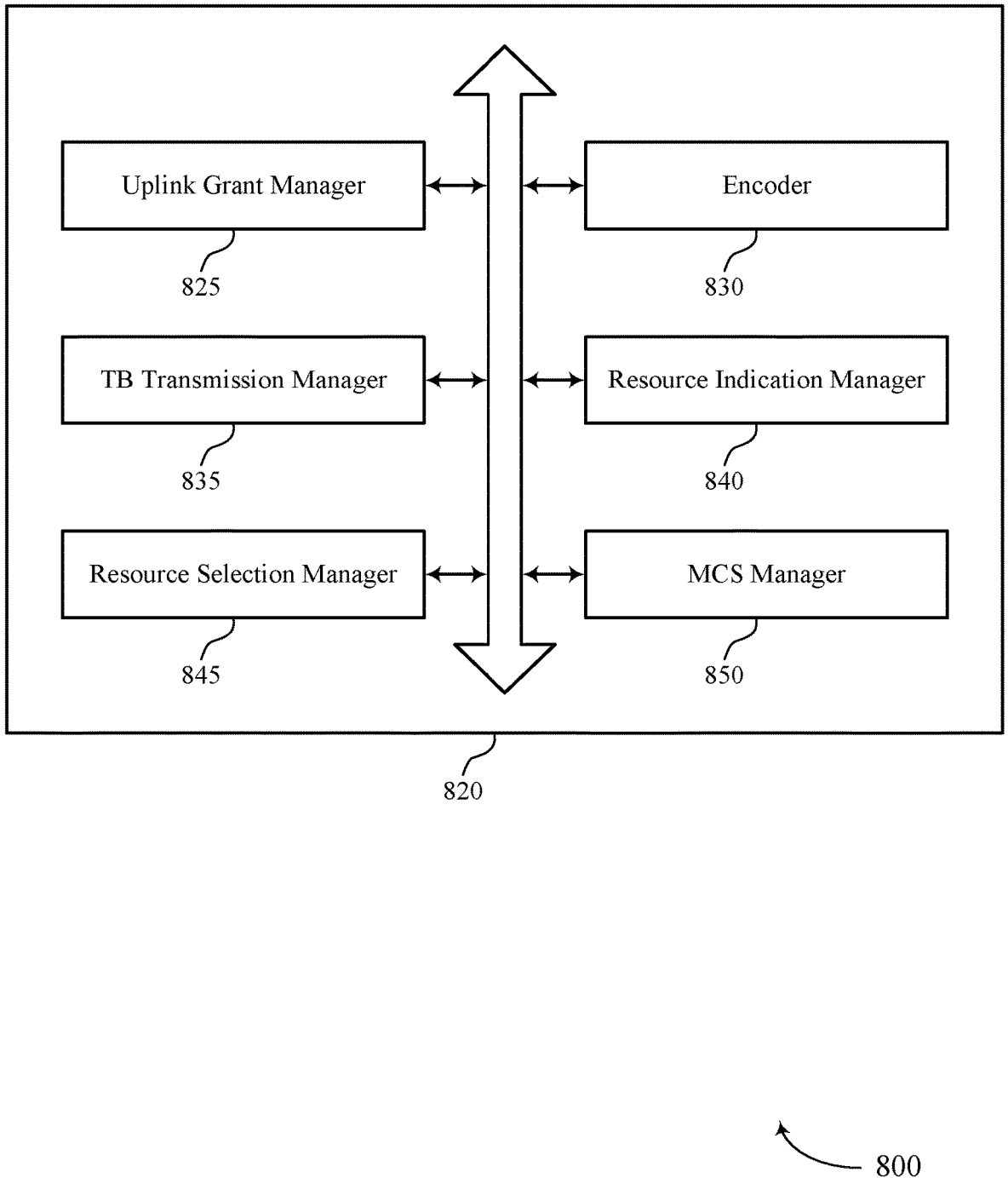
FIG. 8 illustrates a block diagram of a communications manager that supports partial uplink transmission for multiple uplink transport blocks in accordance with one or more aspects of the present disclosure.

FIG. 8 illustrates a block diagram 800 of a communications manager 820 that supports partial uplink transmission for multiple uplink transport blocks in accordance with one or more aspects of the present disclosure. The communications manager 820 may be an example of aspects of a communications manager 620, a communications manager 720, or both, as described herein. The communications manager 820, or various components thereof, may be an example of means for performing various aspects of partial uplink transmission for multiple uplink transport blocks as described herein. For example, the communications manager 820 may include an uplink grant manager 825, an encoder 830, a TB transmission manager 835, a resource indication manager 840, a resource selection manager 845, an MCS manager 850, or any combination thereof. Each of these components may communicate, directly or indirectly, with one another (e.g., via one or more buses).

The communications manager 820 may support wireless communication at a UE in accordance with examples as disclosed herein. The uplink grant manager 825 may be configured as or otherwise support a means for receiving an uplink grant for a set of uplink resources having a first resource allocation size for transmission of at least a first transport block and a second transport block via different transmission layers. The encoder 830 may be configured as or otherwise support a means for encoding data to be transmitted via the first transport block and the second transport block, the first transport block having a first transport block size that is different than a second transport block size of the second transport block, and at least the first transport block size is less than the first resource allocation size of the uplink grant associated with the first transport block. The TB transmission manager 835 may be configured as or otherwise support a means for transmitting the first transport block and the second transport block via the different transmission layers, at least a first subset of the set of uplink resources associated with the first transport block being unused. The resource indication manager 840 may be configured as or otherwise support a means for transmitting an indication of the first subset of the set of uplink resources that are unused for the first transport block.

In some examples, the second transport block size is smaller than the first transport block size and, to support encoding the data to be transmitted, the TB transmission manager 835 may be configured as or otherwise support a means for extending the second transport block to have the first transport block size. In some examples, to support extending the second transport block, the TB transmission manager 835 may be configured as or otherwise support a means for adding one or more padding bits to the second transport block, or cyclically repeating the second transport block.

In some examples, to support transmitting the indication, the resource indication manager 840 may be configured as or otherwise support a means for transmitting uplink control information associated with a configured uplink grant that indicates the first subset of the set of uplink resources, the uplink control information transmitted via one or more of multiplexing with the first transport block or the second transport block, one or more reserved resource elements, or an uplink control channel.

In some examples, the resource selection manager 845 may be configured as or otherwise support a means for determining that a difference between the first transport block size and the first resource allocation size exceeds a threshold value, and where the first subset of the set of uplink resources are unused responsive to the determining. In some examples, the threshold value corresponds to a configured percentage of the first resource allocation size.

In some examples, the second transport block size is smaller than the first transport block size and, to support transmitting the first transport block and the second transport block, the TB transmission manager 835 may be configured as or otherwise support a means for transmitting the second transport block using uplink resources in which a second subset of the set of uplink resources associated with the second transport block are unused, the second subset having a different size than the first subset.

In some examples, to support transmitting the indication, the resource indication manager 840 may be configured as or otherwise support a means for transmitting an indication of the second subset of the set of uplink resources that are unused for the second transport block. In some examples, where the second transport block size is larger than the first transport block size and corresponds to the first resource allocation size associated with the second transport block, and the first transport block occupies fewer resources than the second transport block. In some examples, the second transport block is transmitted using a lower modulation order, a lower coding rate, or both, relative to the first transport block, and occupies a same amount of uplink resources as the first transport block.

In some examples, the TB transmission manager 835 may be configured as or otherwise support a means for receiving a downlink transmission that includes a first downlink transport block and a second downlink transport block that are transmitted via two or more transmission layers, one or more of the first downlink transport block or the second downlink transport block transmitted using fewer resources than a set of downlink resources allocated for the downlink transmission. In some examples, the uplink grant for the set of uplink resources is a dynamic grant for a single set of uplink resources or is a configured grant for a set of multiple sets of uplink resources.

Additionally, or alternatively, the communications manager 820 may support wireless communication at a UE in accordance with examples as disclosed herein. In some examples, the uplink grant manager 825 may be configured as or otherwise support a means for receiving an uplink grant for at least first uplink resources, the uplink grant having a first resource allocation size. In some examples, the encoder 830 may be configured as or otherwise support a means for encoding data to be transmitted in the first uplink resources to generate encoded data, the encoded data occupying less than the first resource allocation size, where the UE is configured to skip transmissions in at least a subset of the first uplink resources when encoded data occupies less than all of the first resource allocation size. In some examples, the TB transmission manager 835 may be configured as or otherwise support a means for extending the encoded data to provide extended encoded data when an uplink control information communication is to be transmitted along with the encoded data in the first uplink resource. In some examples, the TB transmission manager 835 may be configured as or otherwise support a means for transmitting the extended encoded data and the uplink control information communication in the first uplink resources.

In some examples, the uplink grant for the first uplink resources is a dynamic grant for physical uplink shared channel resources, and the uplink control information communication provides one or more of CSI or ACK/NACK feedback associated with one or more downlink transmissions. In some examples, the uplink grant for the first uplink resources is a configured grant for a set of multiple periodic sets of physical uplink shared channel resources, and the uplink control information communication provides one or more of CSI or ACK/NACK feedback associated with one or more downlink transmissions. In some examples, the uplink grant for the first uplink resources is a dynamic grant for physical uplink shared channel resources or a configured grant for a set of multiple periodic sets of physical uplink shared channel resources. In some examples, the uplink control information communication provides one or more of CSI or ACK/NACK feedback associated with one or more downlink transmissions. In some examples, the extended coded data occupies an amount of the first uplink resources that corresponds to a size of the uplink control information communication that is multiplexed with the extended coded data.

In some cases, the uplink grant manager 825, encoder 830, TB transmission manager 835, resource indication manager 840, resource selection manager 845, and MCS manager 850 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the uplink grant manager 825, encoder 830, TB transmission manager 835, resource indication manager 840, resource selection manager 845, and MCS manager 850 discussed herein.

Figure 9:
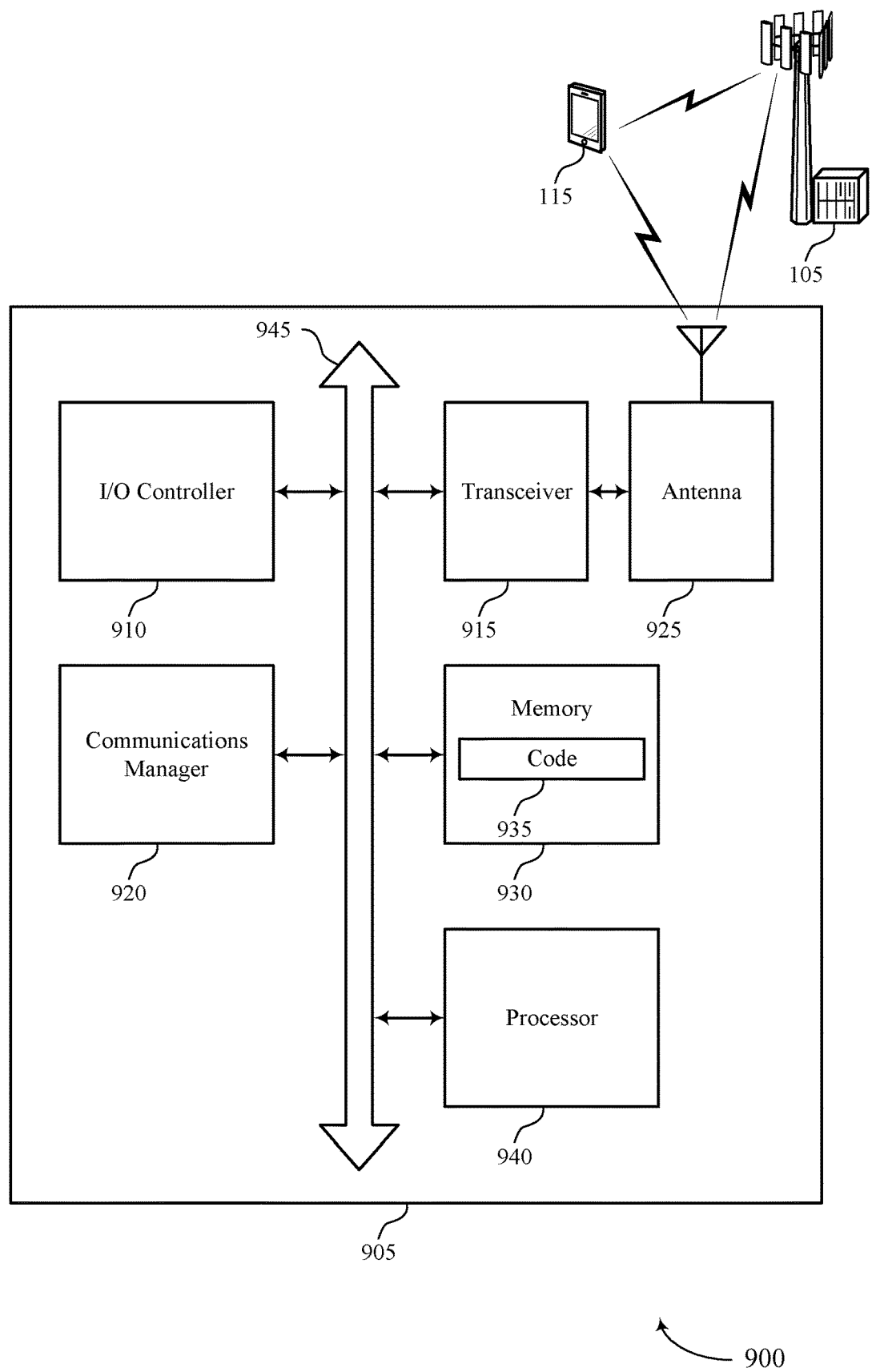
FIG. 9 illustrates a diagram of a system including a device that supports partial uplink transmission for multiple uplink transport blocks in accordance with one or more aspects of the present disclosure.

FIG. 9 illustrates a diagram of a system 900 including a device 905 that supports partial uplink transmission for multiple uplink transport blocks in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting partial uplink transmission for multiple uplink transport blocks). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving an uplink grant for a set of uplink resources having a first resource allocation size for transmission of at least a first transport block and a second transport block via different transmission layers. The communications manager 920 may be configured as or otherwise support a means for encoding data to be transmitted via the first transport block and the second transport block, the first transport block having a first transport block size that is different than a second transport block size of the second transport block, and at least the first transport block size is less than the first resource allocation size of the uplink grant associated with the first transport block. The communications manager 920 may be configured as or otherwise support a means for transmitting the first transport block and the second transport block via the different transmission layers, at least a first subset of the set of uplink resources associated with the first transport block being unused. The communications manager 920 may be configured as or otherwise support a means for transmitting an indication of the first subset of the set of uplink resources that are unused for the first transport block.

Additionally, or alternatively, the communications manager 920 may support wireless communication at a UE in accordance with examples as disclosed herein. For example, the communications manager 920 may be configured as or otherwise support a means for receiving an uplink grant for at least first uplink resources, the uplink grant having a first resource allocation size. The communications manager 920 may be configured as or otherwise support a means for encoding data to be transmitted in the first uplink resources to generate encoded data, the encoded data occupying less than the first resource allocation size, where the UE is configured to skip transmissions in at least a subset of the first uplink resources when encoded data occupies less than all of the first resource allocation size. The communications manager 920 may be configured as or otherwise support a means for extending the encoded data to provide extended encoded data when an uplink control information communication is to be transmitted along with the encoded data in the first uplink resource. The communications manager 920 may be configured as or otherwise support a means for transmitting the extended encoded data and the uplink control information communication in the first uplink resources.

By including or configuring the communications manager 920 in accordance with examples as described herein, the device 905 may support techniques for transmission of multiple transport blocks with reduced latency, improved user experience related to reduced processing, reduced power consumption, more efficient utilization of communication resources, longer battery life, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of partial uplink transmission for multiple uplink transport blocks as described herein, or the processor 940 and the memory 930 may be otherwise configured to perform or support such operations.

Figure 10:
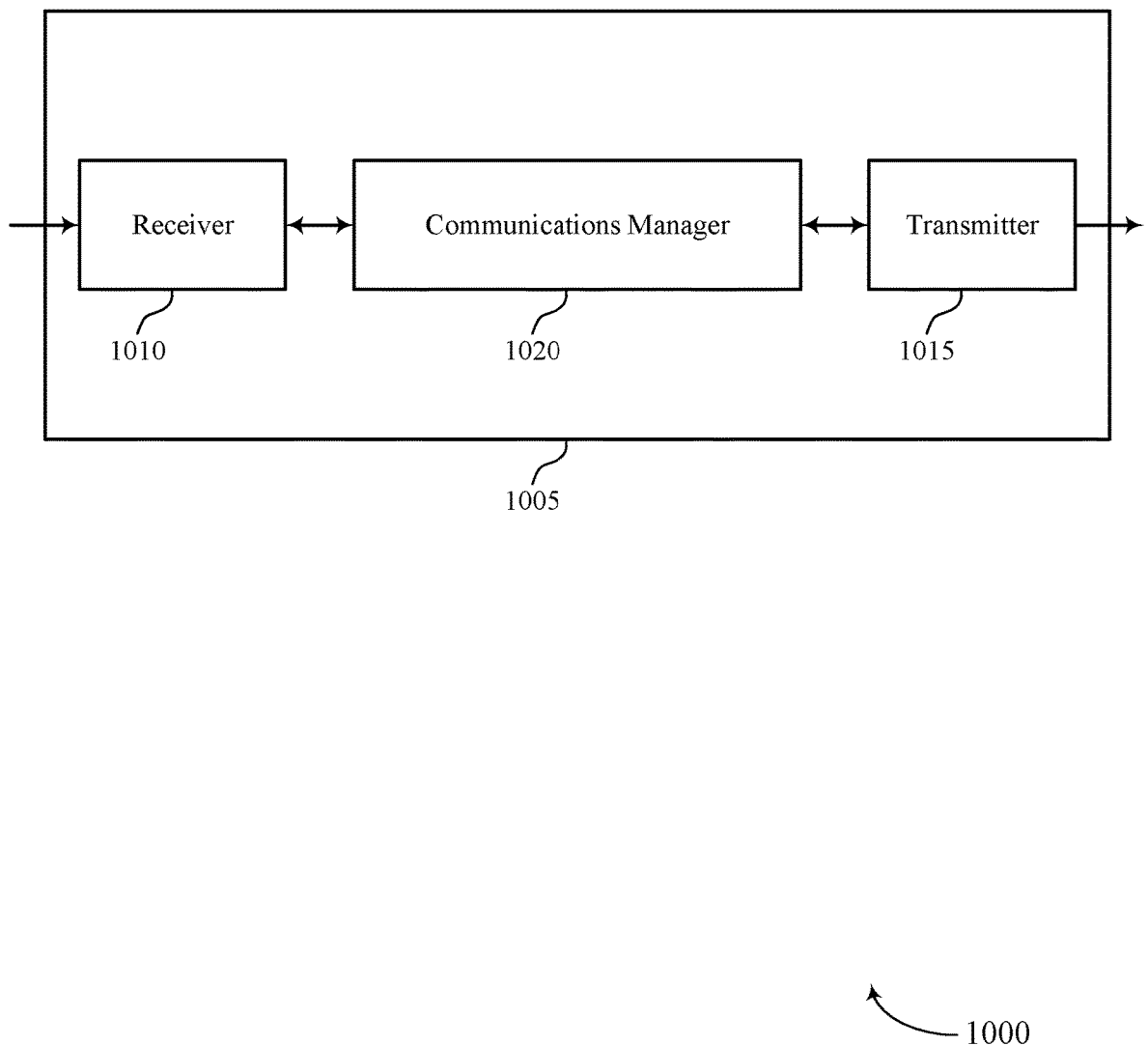
FIGS. 10 and 11 illustrate block diagrams of devices that support partial uplink transmission for multiple uplink transport blocks in accordance with one or more aspects of the present disclosure.

FIG. 10 illustrates a block diagram 1000 of a device 1005 that supports partial uplink transmission for multiple uplink transport blocks in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include one or more processors, memory coupled with the one or more processors, and instructions stored in the memory that are executable by the one or more processors to enable the one or more processors to perform partial uplink transmission for multiple transport blocks discussed herein. Each of these components may be in communication with each other (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of partial uplink transmission for multiple uplink transport blocks as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 may be configured as or otherwise support a means for transmitting, to a UE, an uplink grant for a set of uplink resources having a first resource allocation size for transmission of at least a first transport block and a second transport block via different transmission layers of the set of uplink resources. The communications manager 1020 may be configured as or otherwise support a means for receiving, from the UE, the first transport block and the second transport block via the different transmission layers, at least a first subset of the set of uplink resources associated with the first transport block being unused, and the first transport block having a first transport block size that is different than a second transport block size of the second transport block, and at least the first transport block size is less than the first resource allocation size of the uplink grant associated with the first transport block. The communications manager 1020 may be configured as or otherwise support a means for decoding the first transport block and the second transport block based on an indication of the first subset of the set of uplink resources that are unused for the first transport block.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for uplink transmissions via multiple concurrent transport blocks with reduced power consumption, and more efficient utilization of communication resources.

Figure 11:
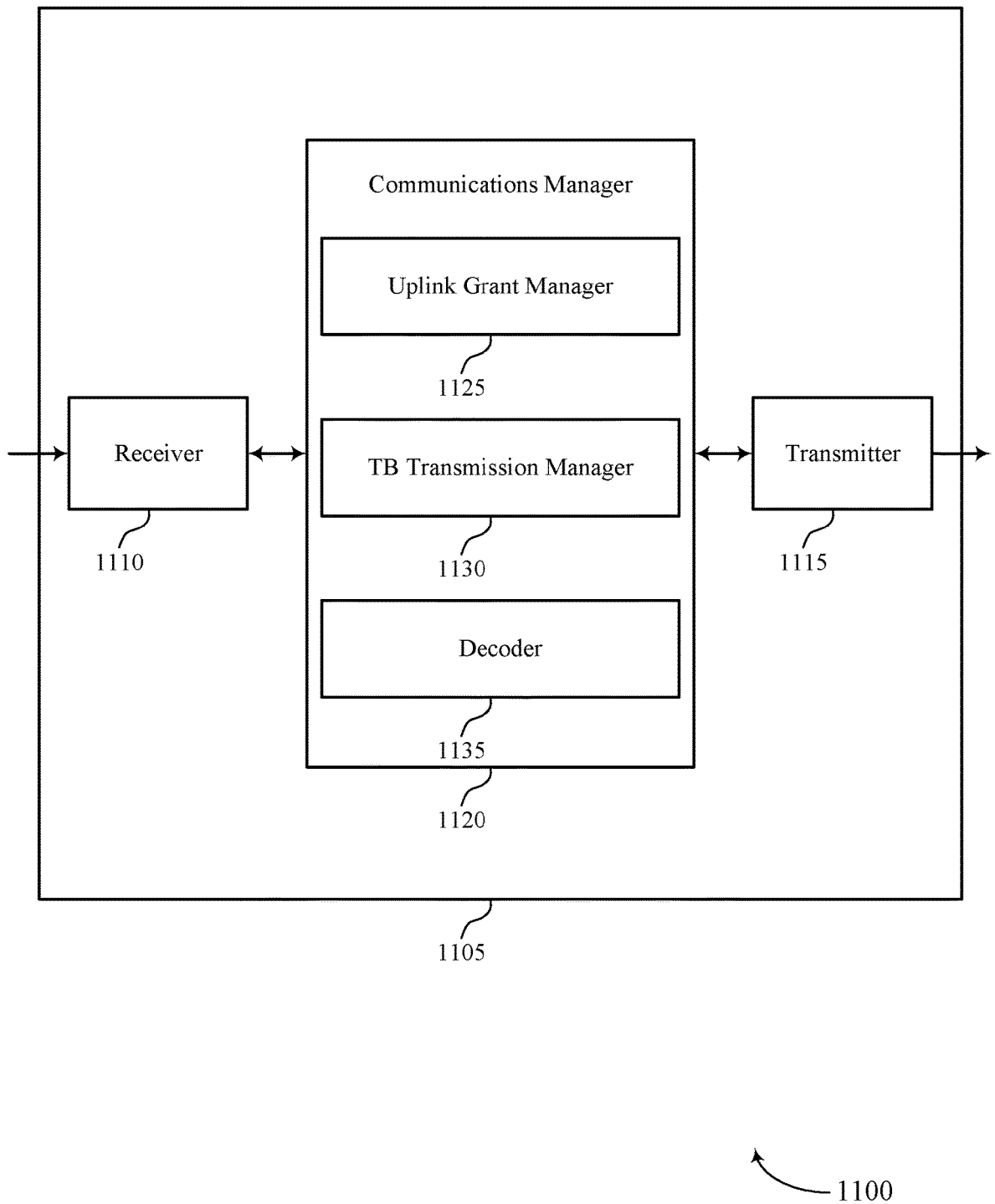

FIG. 11 illustrates a block diagram 1100 of a device 1105 that supports partial uplink transmission for multiple uplink transport blocks in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of partial uplink transmission for multiple uplink transport blocks as described herein. For example, the communications manager 1120 may include an uplink grant manager 1125, a TB transmission manager 1130, a decoder 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The uplink grant manager 1125 may be configured as or otherwise support a means for transmitting, to a UE, an uplink grant for a set of uplink resources having a first resource allocation size for transmission of at least a first transport block and a second transport block via different transmission layers of the set of uplink resources. The TB transmission manager 1130 may be configured as or otherwise support a means for receiving, from the UE, the first transport block and the second transport block via the different transmission layers, at least a first subset of the set of uplink resources associated with the first transport block being unused, and the first transport block having a first transport block size that is different than a second transport block size of the second transport block, and at least the first transport block size is less than the first resource allocation size of the uplink grant associated with the first transport block. The decoder 1135 may be configured as or otherwise support a means for decoding the first transport block and the second transport block based on an indication of the first subset of the set of uplink resources that are unused for the first transport block.

In some cases, the uplink grant manager 1125, TB transmission manager 1130, and decoder 1135 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the uplink grant manager 1125, TB transmission manager 1130, and decoder 1135 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 12:
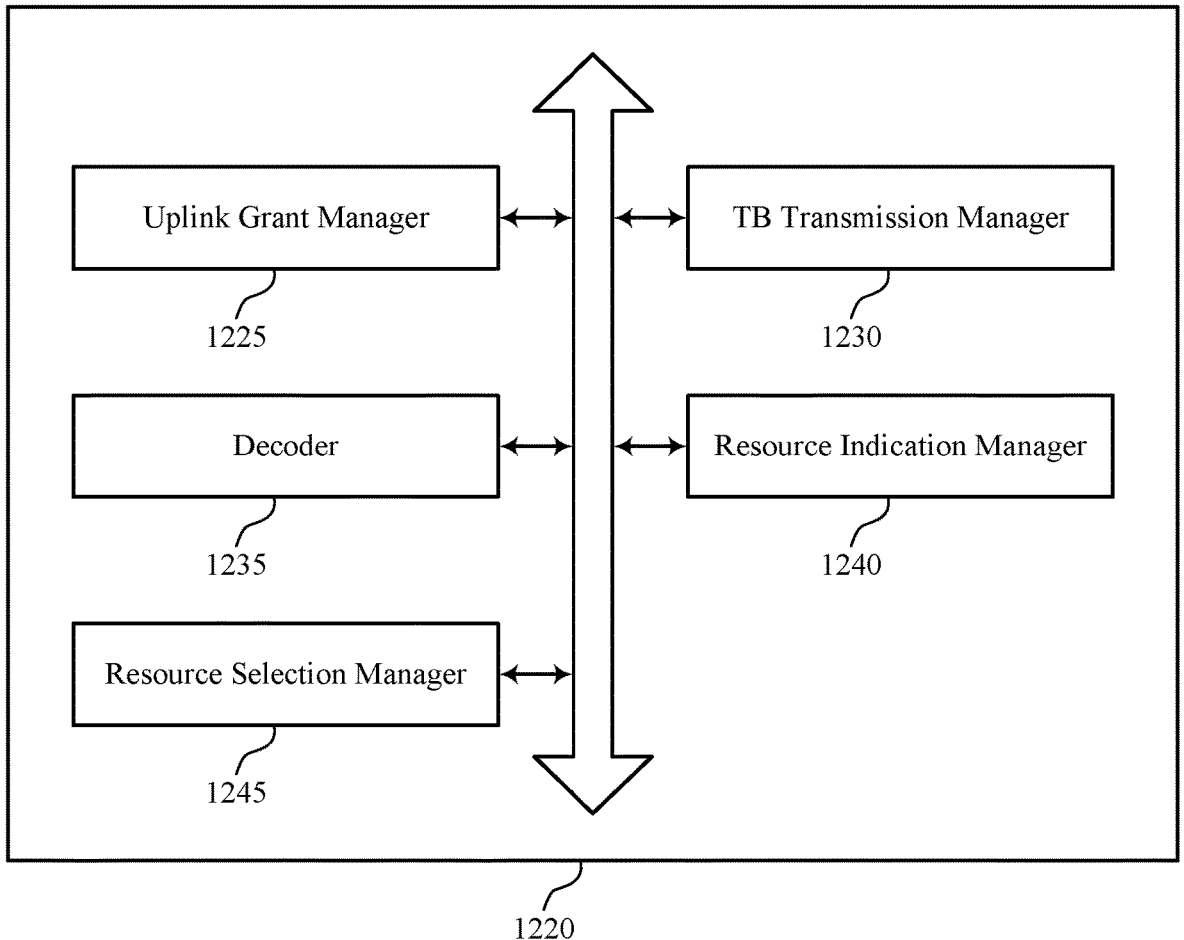
FIG. 12 illustrates a block diagram of a communications manager that supports partial uplink transmission for multiple uplink transport blocks in accordance with one or more aspects of the present disclosure.

FIG. 12 illustrates a block diagram 1200 of a communications manager 1220 that supports partial uplink transmission for multiple uplink transport blocks in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of partial uplink transmission for multiple uplink transport blocks as described herein. For example, the communications manager 1220 may include an uplink grant manager 1225, a TB transmission manager 1230, a decoder 1235, a resource indication manager 1240, a resource selection manager 1245, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The uplink grant manager 1225 may be configured as or otherwise support a means for transmitting, to a UE, an uplink grant for a set of uplink resources having a first resource allocation size for transmission of at least a first transport block and a second transport block via different transmission layers of the set of uplink resources. The TB transmission manager 1230 may be configured as or otherwise support a means for receiving, from the UE, the first transport block and the second transport block via the different transmission layers, at least a first subset of the set of uplink resources associated with the first transport block being unused, and the first transport block having a first transport block size that is different than a second transport block size of the second transport block, and at least the first transport block size is less than the first resource allocation size of the uplink grant associated with the first transport block. The decoder 1235 may be configured as or otherwise support a means for decoding the first transport block and the second transport block based on an indication of the first subset of the set of uplink resources that are unused for the first transport block.

In some examples, the second transport block size is smaller than the first transport block size and, to support encoding the data to be transmitted, the TB transmission manager 1230 may be configured as or otherwise support a means for extending the second transport block to have the first transport block size. In some examples, the resource indication manager 1240 may be configured as or otherwise support a means for receiving, from the UE, uplink control information that includes the indication of the first subset of the set of uplink resources, the uplink control information transmitted via one or more of multiplexing with the first transport block or the second transport block, one or more reserved resource elements, or an uplink control channel.

In some examples, the resource selection manager 1245 may be configured as or otherwise support a means for configuring the UE with a threshold value for skipping transmissions in the first subset of the set of uplink resources, the threshold value corresponding to percentage of the first resource allocation size. In some examples, where the second transport block size is larger than the first transport block size and corresponds to the first resource allocation size associated with the second transport block, and the first transport block occupies fewer resources than the second transport block.

In some examples, the TB transmission manager 1230 may be configured as or otherwise support a means for transmitting, to the UE, a downlink transmission that includes a first downlink transport block and a second downlink transport block that are transmitted via two or more transmission layers, one or more of the first downlink transport block or the second downlink transport block transmitted using fewer resources than a set of downlink resources allocated for the downlink transmission.

In some cases, the uplink grant manager 1225, TB transmission manager 1230, decoder 1235, resource indication manager 1240, and resource selection manager 1245 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the uplink grant manager 1225, TB transmission manager 1230, decoder 1235, resource indication manager 1240, and resource selection manager 1245 discussed herein.

Figure 13:
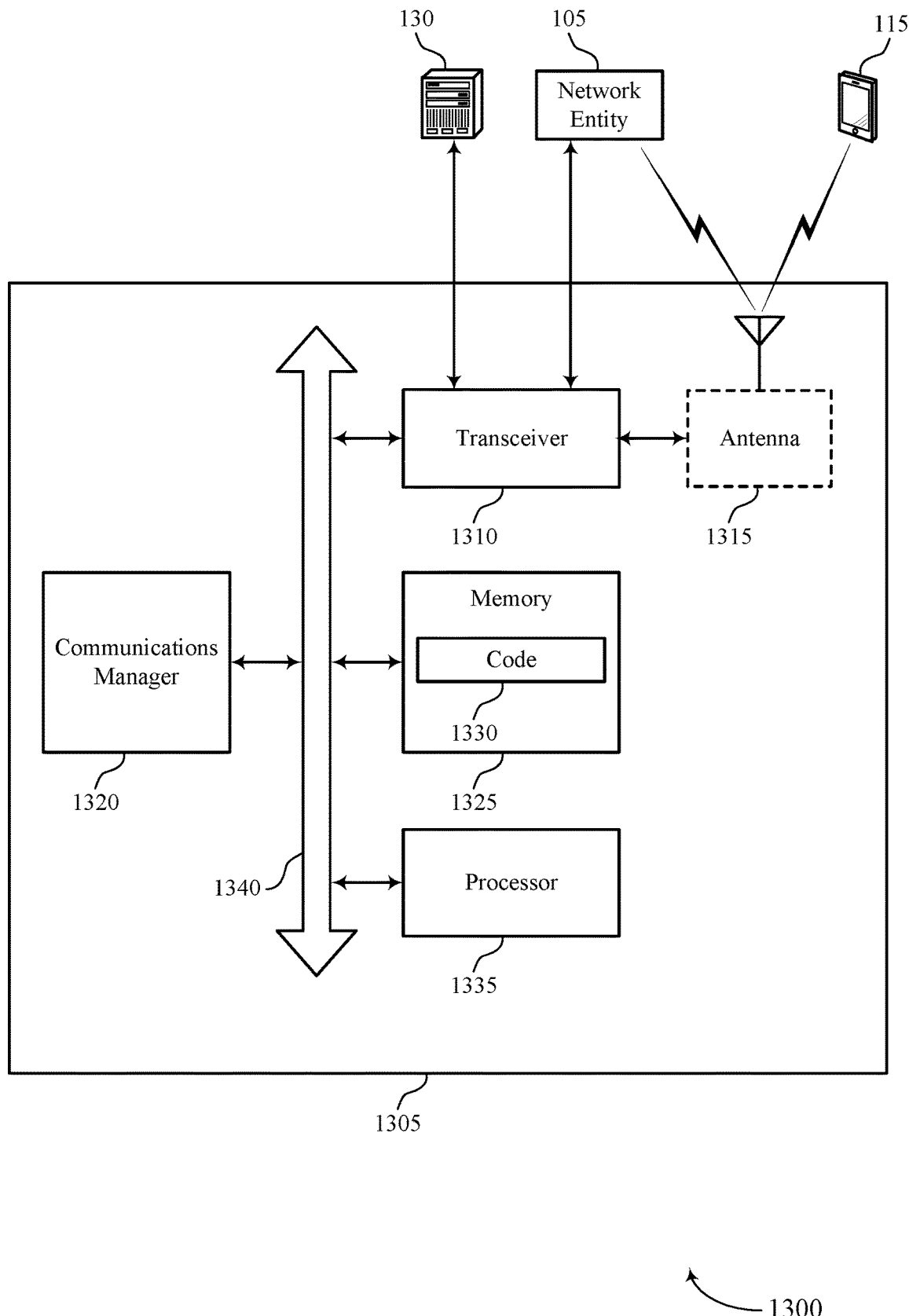
FIG. 13 illustrates a diagram of a system including a device that supports partial uplink transmission for multiple uplink transport blocks in accordance with one or more aspects of the present disclosure.

FIG. 13 illustrates a diagram of a system 1300 including a device 1305 that supports partial uplink transmission for multiple uplink transport blocks in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting partial uplink transmission for multiple uplink transport blocks). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for transmitting, to a UE, an uplink grant for a set of uplink resources having a first resource allocation size for transmission of at least a first transport block and a second transport block via different transmission layers of the set of uplink resources. The communications manager 1320 may be configured as or otherwise support a means for receiving, from the UE, the first transport block and the second transport block via the different transmission layers, at least a first subset of the set of uplink resources associated with the first transport block being unused, and the first transport block having a first transport block size that is different than a second transport block size of the second transport block, and at least the first transport block size is less than the first resource allocation size of the uplink grant associated with the first transport block. The communications manager 1320 may be configured as or otherwise support a means for decoding the first transport block and the second transport block based on an indication of the first subset of the set of uplink resources that are unused for the first transport block.

By including or configuring the communications manager 1320 in accordance with examples as described herein, the device 1305 may support techniques for transmission of multiple transport blocks with reduced latency, improved user experience related to reduced processing, reduced power consumption, more efficient utilization of communication resources, longer battery life, and improved utilization of processing capability.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of partial uplink transmission for multiple uplink transport blocks as described herein, or the processor 1335 and the memory 1325 may be otherwise configured to perform or support such operations.

Figure 14:
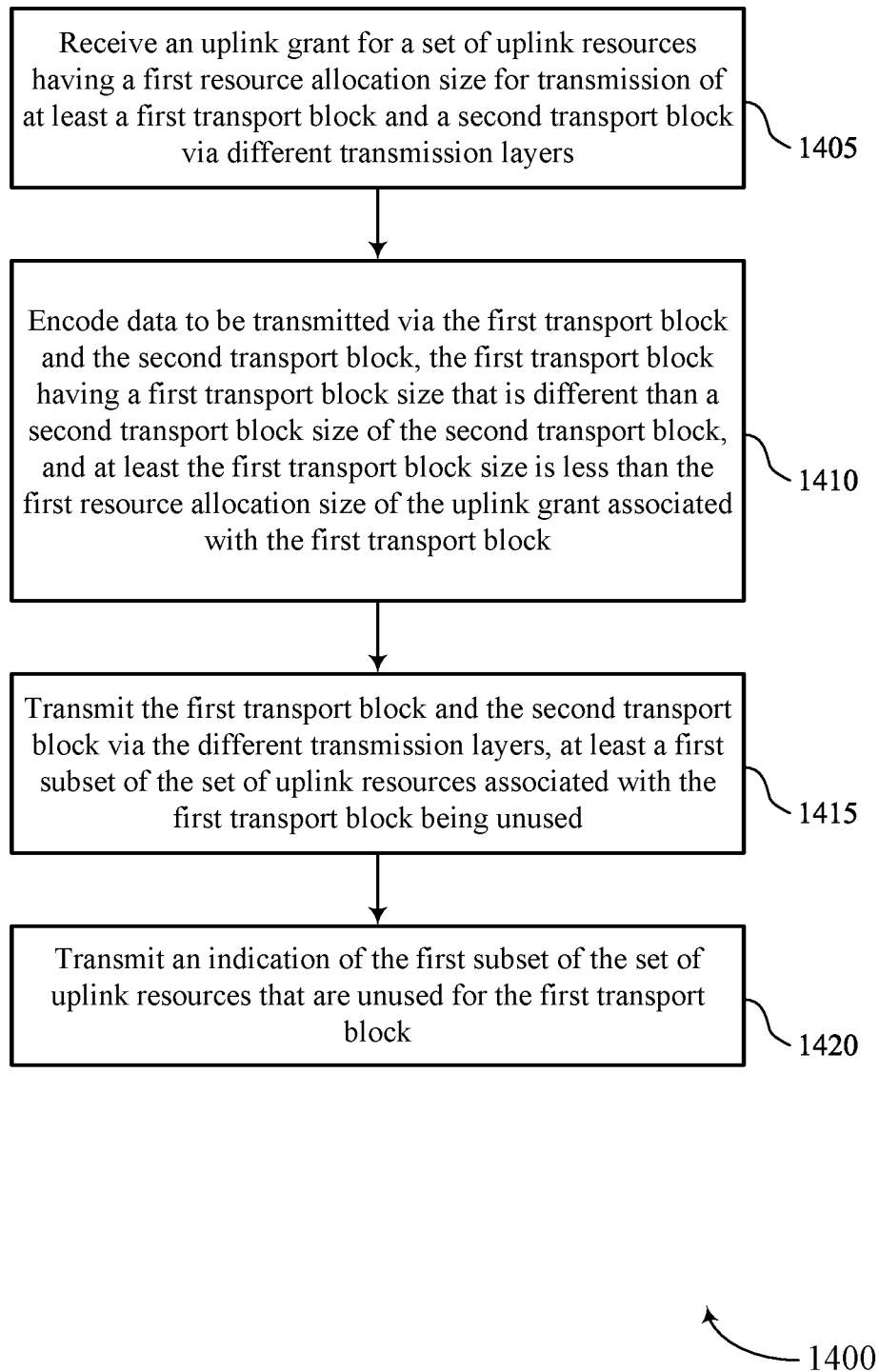
FIGS. 14 through 22 illustrate flowcharts showing methods that support partial uplink transmission for multiple uplink transport blocks in accordance with one or more aspects of the present disclosure.

FIG. 14 illustrates a flowchart showing a method 1400 that supports partial uplink transmission for multiple uplink transport blocks in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving an uplink grant for a set of uplink resources having a first resource allocation size for transmission of at least a first transport block and a second transport block via different transmission layers. The operations of 1405 may be performed in accordance with examples as disclosed herein. In some examples, aspects of the operations of 1405 may be performed by an uplink grant manager 825 as described with reference to FIG. 8.

At 1410, the method may include encoding data to be transmitted via the first transport block and the second transport block, the first transport block having a first transport block size that is different than a second transport block size of the second transport block, and at least the first transport block size is less than the first resource allocation size of the uplink grant associated with the first transport block. The operations of 1410 may be performed in accordance with examples as disclosed herein. In some examples, aspects of the operations of 1410 may be performed by an encoder 830 as described with reference to FIG. 8.

At 1415, the method may include transmitting the first transport block and the second transport block via the different transmission layers, at least a first subset of the set of uplink resources associated with the first transport block being unused. The operations of 1415 may be performed in accordance with examples as disclosed herein. In some examples, aspects of the operations of 1415 may be performed by a TB transmission manager 835 as described with reference to FIG. 8.

At 1420, the method may include transmitting an indication of the first subset of the set of uplink resources that are unused for the first transport block. The operations of 1420 may be performed in accordance with examples as disclosed herein. In some examples, aspects of the operations of 1420 may be performed by a resource indication manager 840 as described with reference to FIG. 8.

Figure 15:
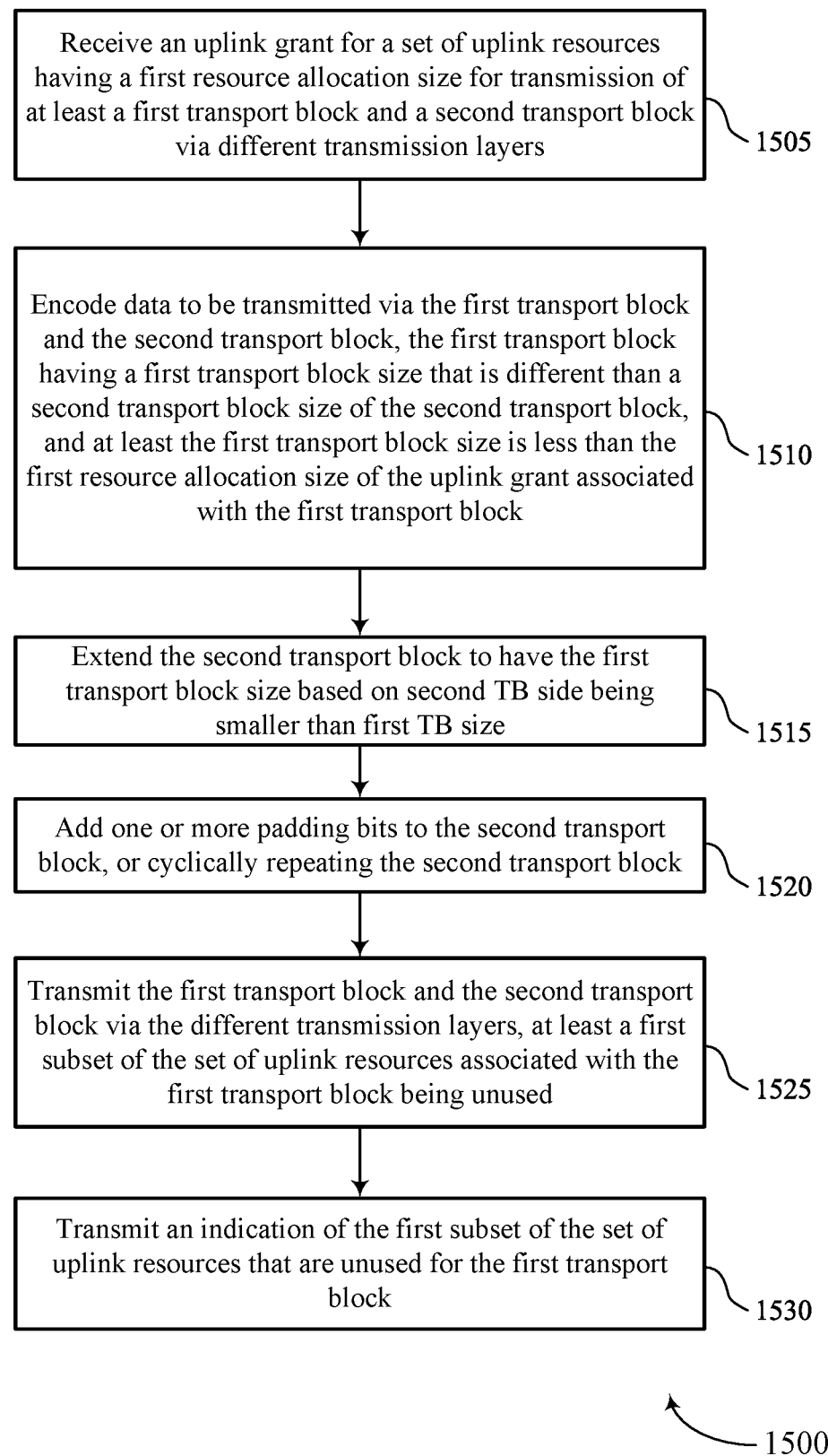

FIG. 15 illustrates a flowchart showing a method 1500 that supports partial uplink transmission for multiple uplink transport blocks in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving an uplink grant for a set of uplink resources having a first resource allocation size for transmission of at least a first transport block and a second transport block via different transmission layers. The operations of 1505 may be performed in accordance with examples as disclosed herein. In some examples, aspects of the operations of 1505 may be performed by an uplink grant manager 825 as described with reference to FIG. 8.

At 1510, the method may include encoding data to be transmitted via the first transport block and the second transport block, the first transport block having a first transport block size that is different than a second transport block size of the second transport block, and at least the first transport block size is less than the first resource allocation size of the uplink grant associated with the first transport block. The operations of 1510 may be performed in accordance with examples as disclosed herein. In some examples, aspects of the operations of 1510 may be performed by an encoder 830 as described with reference to FIG. 8.

At 1515, the method may include extending the second transport block to have the first transport block size based on the second transport block size being smaller than the first transport block size. The operations of 1515 may be performed in accordance with examples as disclosed herein. In some examples, aspects of the operations of 1515 may be performed by a TB transmission manager 835 as described with reference to FIG. 8.

At 1520, the method may include adding one or more padding bits to the second transport block, or cyclically repeating the second transport block. The operations of 1520 may be performed in accordance with examples as disclosed herein. In some examples, aspects of the operations of 1520 may be performed by a TB transmission manager 835 as described with reference to FIG. 8.

At 1525, the method may include transmitting the first transport block and the second transport block via the different transmission layers, at least a first subset of the set of uplink resources associated with the first transport block being unused. The operations of 1525 may be performed in accordance with examples as disclosed herein. In some examples, aspects of the operations of 1525 may be performed by a TB transmission manager 835 as described with reference to FIG. 8.

At 1530, the method may include transmitting an indication of the first subset of the set of uplink resources that are unused for the first transport block. The operations of 1530 may be performed in accordance with examples as disclosed herein. In some examples, aspects of the operations of 1530 may be performed by a resource indication manager 840 as described with reference to FIG. 8.

Figure 16:
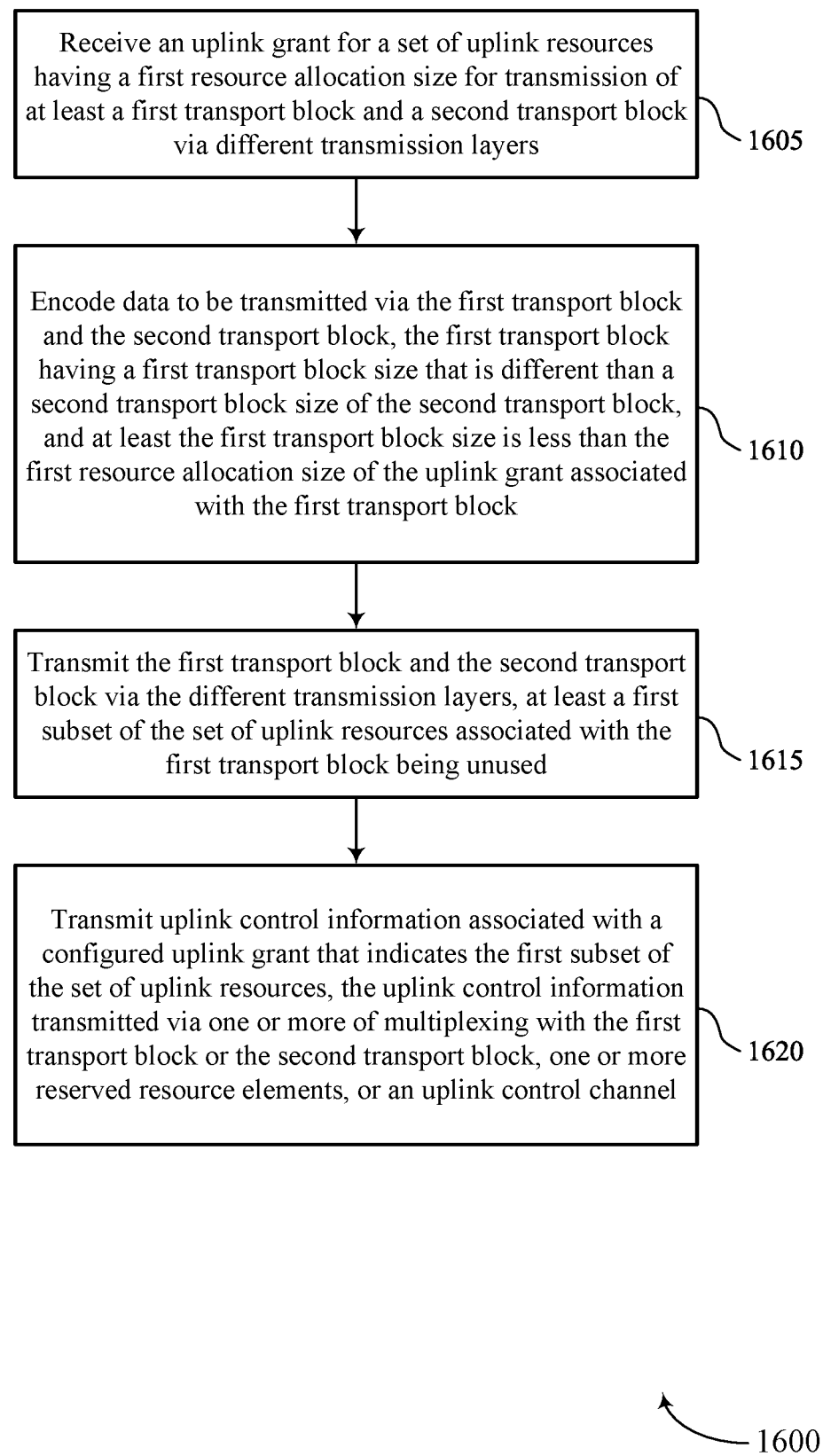

FIG. 16 illustrates a flowchart showing a method 1600 that supports partial uplink transmission for multiple uplink transport blocks in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving an uplink grant for a set of uplink resources having a first resource allocation size for transmission of at least a first transport block and a second transport block via different transmission layers. The operations of 1605 may be performed in accordance with examples as disclosed herein. In some examples, aspects of the operations of 1605 may be performed by an uplink grant manager 825 as described with reference to FIG. 8.

At 1610, the method may include encoding data to be transmitted via the first transport block and the second transport block, the first transport block having a first transport block size that is different than a second transport block size of the second transport block, and at least the first transport block size is less than the first resource allocation size of the uplink grant associated with the first transport block. The operations of 1610 may be performed in accordance with examples as disclosed herein. In some examples, aspects of the operations of 1610 may be performed by an encoder 830 as described with reference to FIG. 8.

At 1615, the method may include transmitting the first transport block and the second transport block via the different transmission layers, at least a first subset of the set of uplink resources associated with the first transport block being unused. The operations of 1615 may be performed in accordance with examples as disclosed herein. In some examples, aspects of the operations of 1615 may be performed by a TB transmission manager 835 as described with reference to FIG. 8.

At 1620, the method may include transmitting uplink control information associated with a configured uplink grant that indicates the first subset of the set of uplink resources, the uplink control information transmitted via one or more of multiplexing with the first transport block or the second transport block, one or more reserved resource elements, or an uplink control channel. The operations of 1620 may be performed in accordance with examples as disclosed herein. In some examples, aspects of the operations of 1620 may be performed by a resource indication manager 840 as described with reference to FIG. 8.

Figure 17:
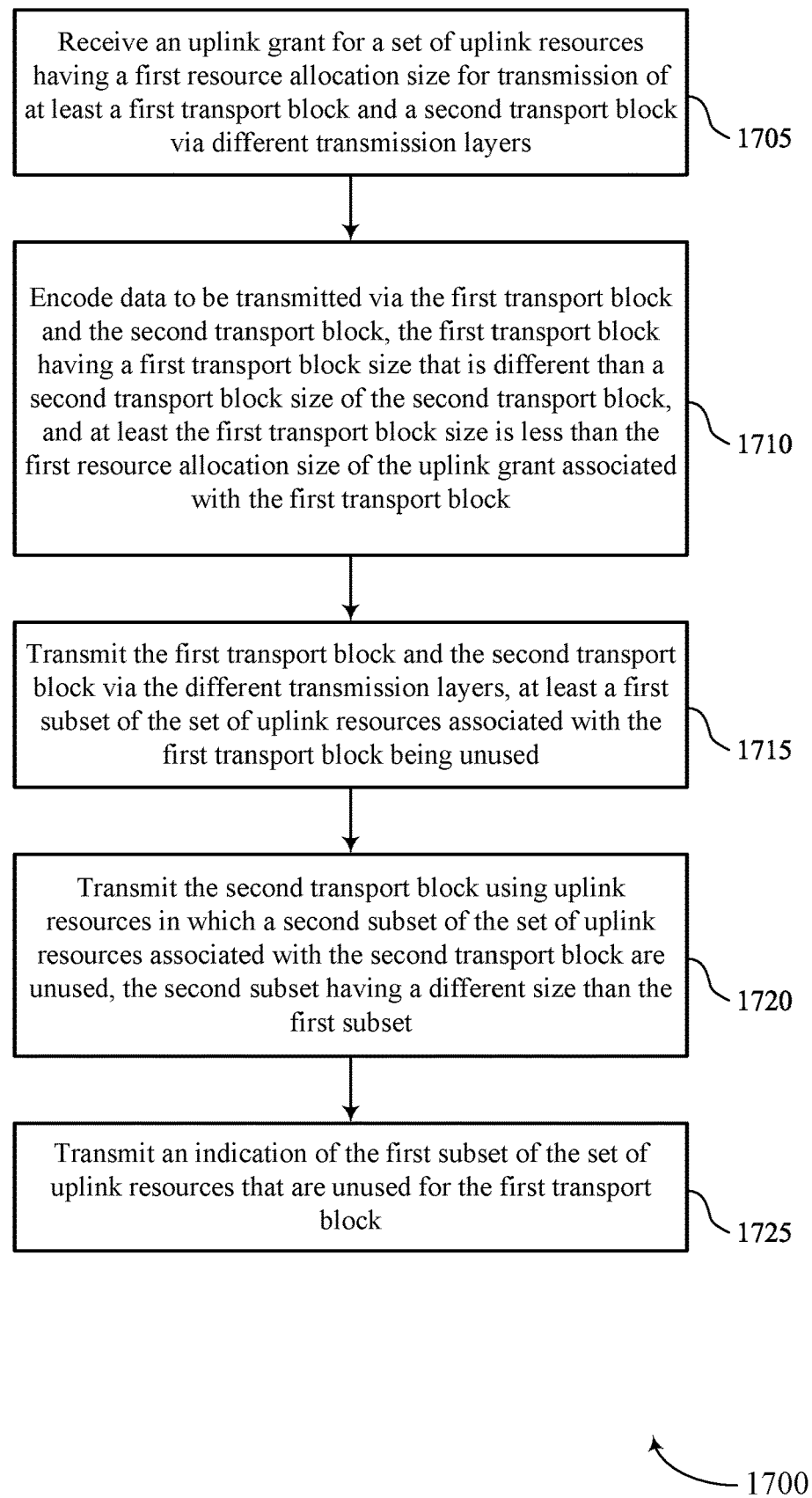

FIG. 17 illustrates a flowchart showing a method 1700 that supports partial uplink transmission for multiple uplink transport blocks in accordance with one or more aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1705, the method may include receiving an uplink grant for a set of uplink resources having a first resource allocation size for transmission of at least a first transport block and a second transport block via different transmission layers. The operations of 1705 may be performed in accordance with examples as disclosed herein. In some examples, aspects of the operations of 1705 may be performed by an uplink grant manager 825 as described with reference to FIG. 8.

At 1710, the method may include encoding data to be transmitted via the first transport block and the second transport block, the first transport block having a first transport block size that is different than a second transport block size of the second transport block, and at least the first transport block size is less than the first resource allocation size of the uplink grant associated with the first transport block. The operations of 1710 may be performed in accordance with examples as disclosed herein. In some examples, aspects of the operations of 1710 may be performed by an encoder 830 as described with reference to FIG. 8.

At 1715, the method may include transmitting the first transport block and the second transport block via the different transmission layers, at least a first subset of the set of uplink resources associated with the first transport block being unused. The operations of 1715 may be performed in accordance with examples as disclosed herein. In some examples, aspects of the operations of 1715 may be performed by a TB transmission manager 835 as described with reference to FIG. 8.

At 1720, the method may include transmitting the second transport block using uplink resources in which a second subset of the set of uplink resources associated with the second transport block are unused, the second subset having a different size than the first subset. The operations of 1720 may be performed in accordance with examples as disclosed herein. In some examples, aspects of the operations of 1720 may be performed by a TB transmission manager 835 as described with reference to FIG. 8.

At 1725, the method may include transmitting an indication of the first subset of the set of uplink resources that are unused for the first transport block. The operations of 1725 may be performed in accordance with examples as disclosed herein. In some examples, aspects of the operations of 1725 may be performed by a resource indication manager 840 as described with reference to FIG. 8.

Figure 18:
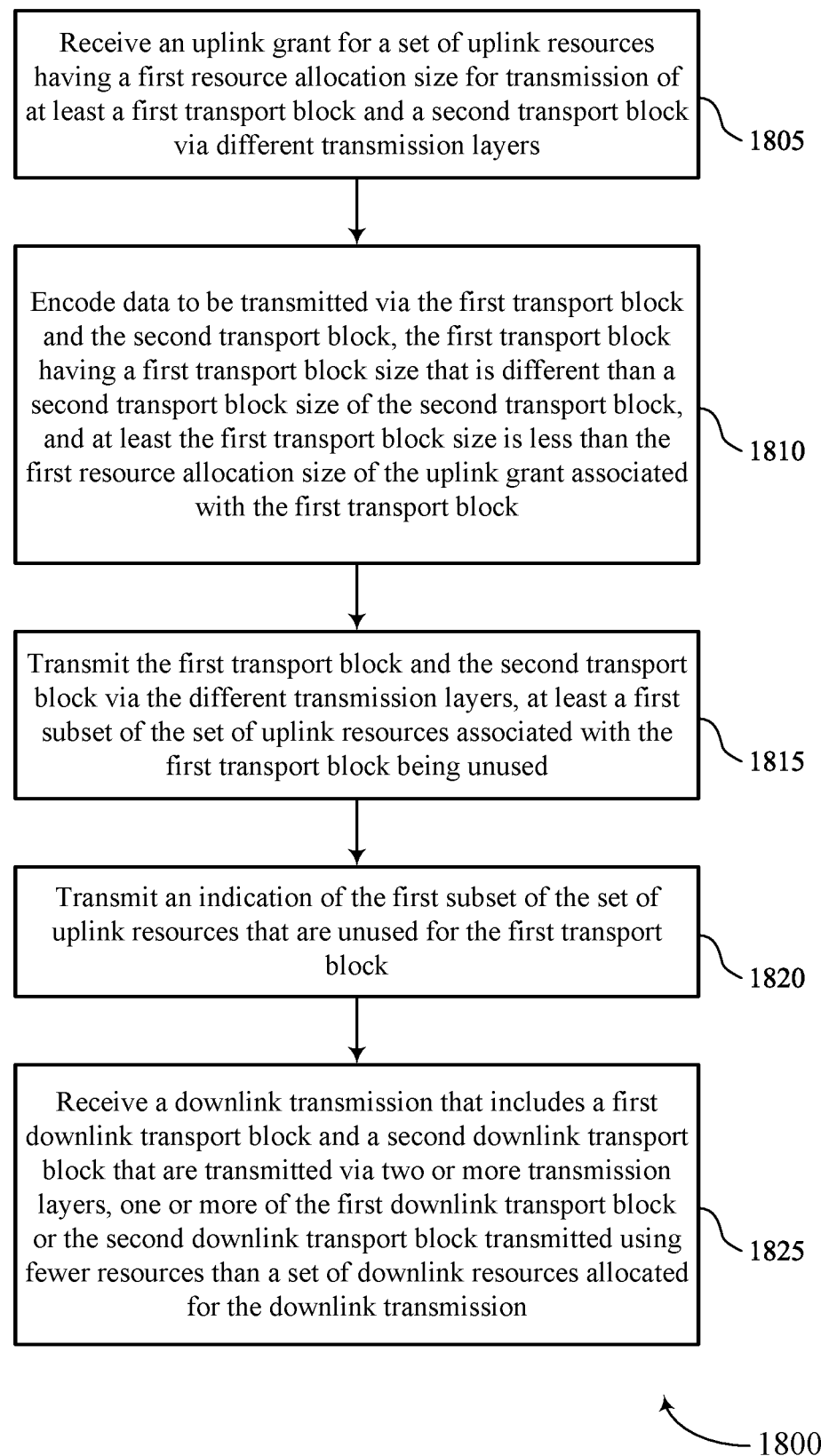

FIG. 18 illustrates a flowchart showing a method 1800 that supports partial uplink transmission for multiple uplink transport blocks in accordance with one or more aspects of the present disclosure. The operations of the method 1800 may be implemented by a UE or its components as described herein. For example, the operations of the method 1800 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1805, the method may include receiving an uplink grant for a set of uplink resources having a first resource allocation size for transmission of at least a first transport block and a second transport block via different transmission layers. The operations of 1805 may be performed in accordance with examples as disclosed herein. In some examples, aspects of the operations of 1805 may be performed by an uplink grant manager 825 as described with reference to FIG. 8.

At 1810, the method may include encoding data to be transmitted via the first transport block and the second transport block, the first transport block having a first transport block size that is different than a second transport block size of the second transport block, and at least the first transport block size is less than the first resource allocation size of the uplink grant associated with the first transport block. The operations of 1810 may be performed in accordance with examples as disclosed herein. In some examples, aspects of the operations of 1810 may be performed by an encoder 830 as described with reference to FIG. 8.

At 1815, the method may include transmitting the first transport block and the second transport block via the different transmission layers, at least a first subset of the set of uplink resources associated with the first transport block being unused. The operations of 1815 may be performed in accordance with examples as disclosed herein. In some examples, aspects of the operations of 1815 may be performed by a TB transmission manager 835 as described with reference to FIG. 8.

At 1820, the method may include transmitting an indication of the first subset of the set of uplink resources that are unused for the first transport block. The operations of 1820 may be performed in accordance with examples as disclosed herein. In some examples, aspects of the operations of 1820 may be performed by a resource indication manager 840 as described with reference to FIG. 8.

At 1825, the method may include receiving a downlink transmission that includes a first downlink transport block and a second downlink transport block that are transmitted via two or more transmission layers, one or more of the first downlink transport block or the second downlink transport block transmitted using fewer resources than a set of downlink resources allocated for the downlink transmission. The operations of 1825 may be performed in accordance with examples as disclosed herein. In some examples, aspects of the operations of 1825 may be performed by a TB transmission manager 835 as described with reference to FIG. 8.

Figure 19:
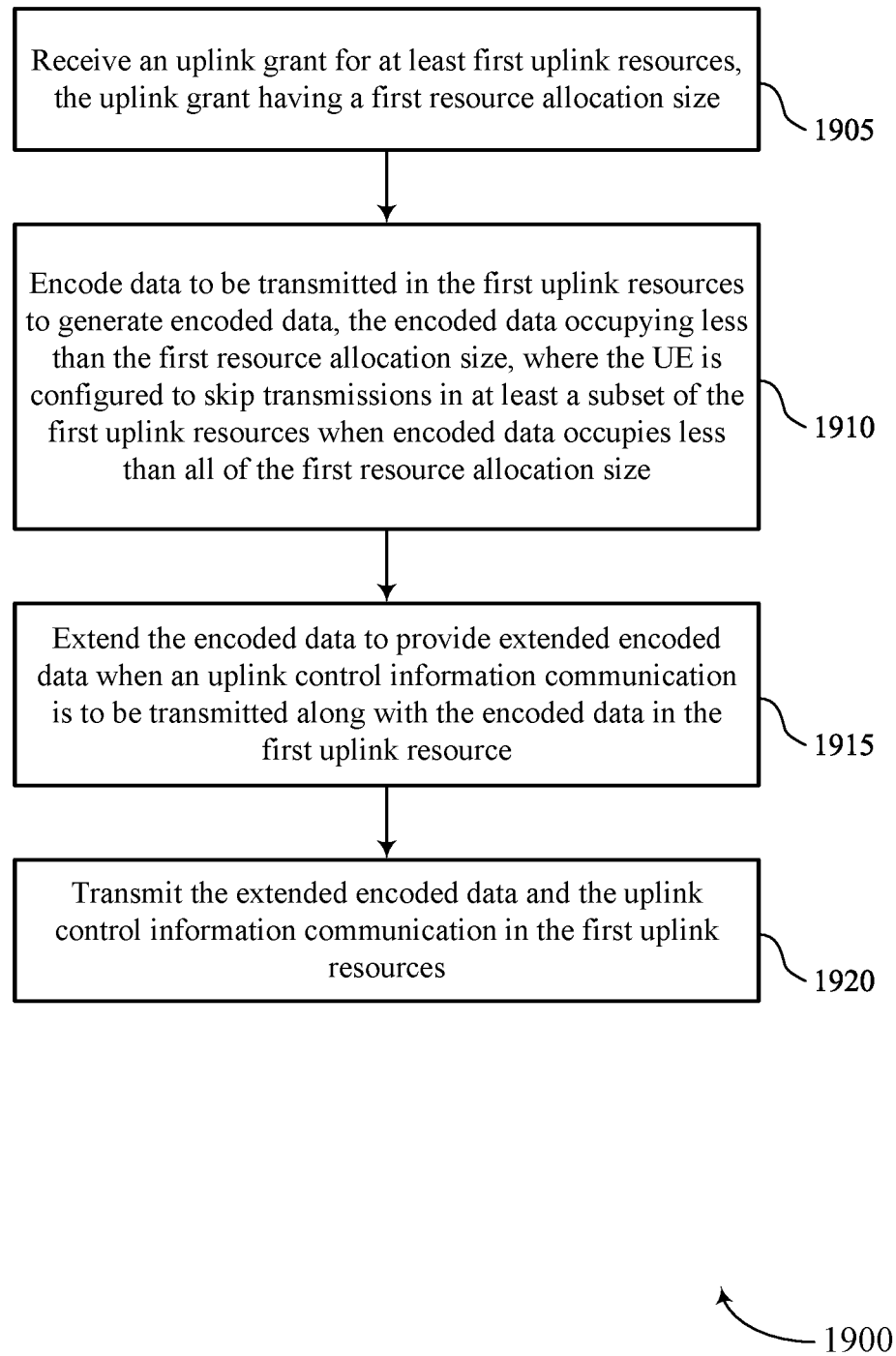

FIG. 19 illustrates a flowchart showing a method 1900 that supports partial uplink transmission for multiple uplink transport blocks in accordance with one or more aspects of the present disclosure. The operations of the method 1900 may be implemented by a UE or its components as described herein. For example, the operations of the method 1900 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1905, the method may include receiving an uplink grant for at least first uplink resources, the uplink grant having a first resource allocation size. The operations of 1905 may be performed in accordance with examples as disclosed herein. In some examples, aspects of the operations of 1905 may be performed by an uplink grant manager 825 as described with reference to FIG. 8.

At 1910, the method may include encoding data to be transmitted in the first uplink resources to generate encoded data, the encoded data occupying less than the first resource allocation size, where the UE is configured to skip transmissions in at least a subset of the first uplink resources when encoded data occupies less than all of the first resource allocation size. The operations of 1910 may be performed in accordance with examples as disclosed herein. In some examples, aspects of the operations of 1910 may be performed by an encoder 830 as described with reference to FIG. 8.

At 1915, the method may include extending the encoded data to provide extended encoded data when an uplink control information communication is to be transmitted along with the encoded data in the first uplink resource. The operations of 1915 may be performed in accordance with examples as disclosed herein. In some examples, aspects of the operations of 1915 may be performed by a TB transmission manager 835 as described with reference to FIG. 8.

At 1920, the method may include transmitting the extended encoded data and the uplink control information communication in the first uplink resources. The operations of 1920 may be performed in accordance with examples as disclosed herein. In some examples, aspects of the operations of 1920 may be performed by a TB transmission manager 835 as described with reference to FIG. 8.

Figure 20:
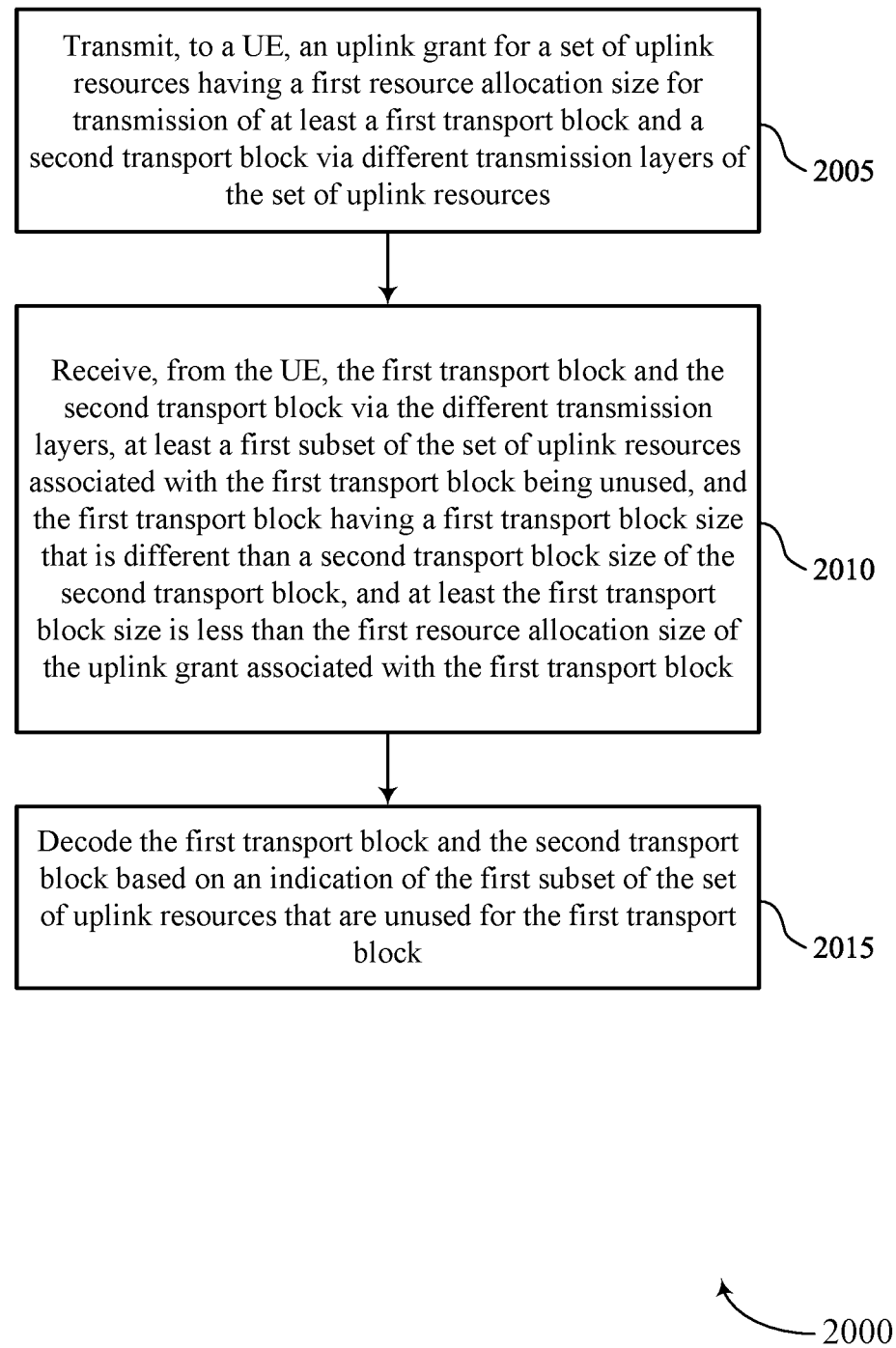

FIG. 20 illustrates a flowchart showing a method 2000 that supports partial uplink transmission for multiple uplink transport blocks in accordance with one or more aspects of the present disclosure. The operations of the method 2000 may be implemented by a network entity or its components as described herein. For example, the operations of the method 2000 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2005, the method may include transmitting, to a UE, an uplink grant for a set of uplink resources having a first resource allocation size for transmission of at least a first transport block and a second transport block via different transmission layers of the set of uplink resources. The operations of 2005 may be performed in accordance with examples as disclosed herein. In some examples, aspects of the operations of 2005 may be performed by an uplink grant manager 1225 as described with reference to FIG. 12.

At 2010, the method may include receiving, from the UE, the first transport block and the second transport block via the different transmission layers, at least a first subset of the set of uplink resources associated with the first transport block being unused, and the first transport block having a first transport block size that is different than a second transport block size of the second transport block, and at least the first transport block size is less than the first resource allocation size of the uplink grant associated with the first transport block. The operations of 2010 may be performed in accordance with examples as disclosed herein. In some examples, aspects of the operations of 2010 may be performed by a TB transmission manager 1230 as described with reference to FIG. 12.

At 2015, the method may include decoding the first transport block and the second transport block based on an indication of the first subset of the set of uplink resources that are unused for the first transport block. The operations of 2015 may be performed in accordance with examples as disclosed herein. In some examples, aspects of the operations of 2015 may be performed by a decoder 1235 as described with reference to FIG. 12.

Figure 21:
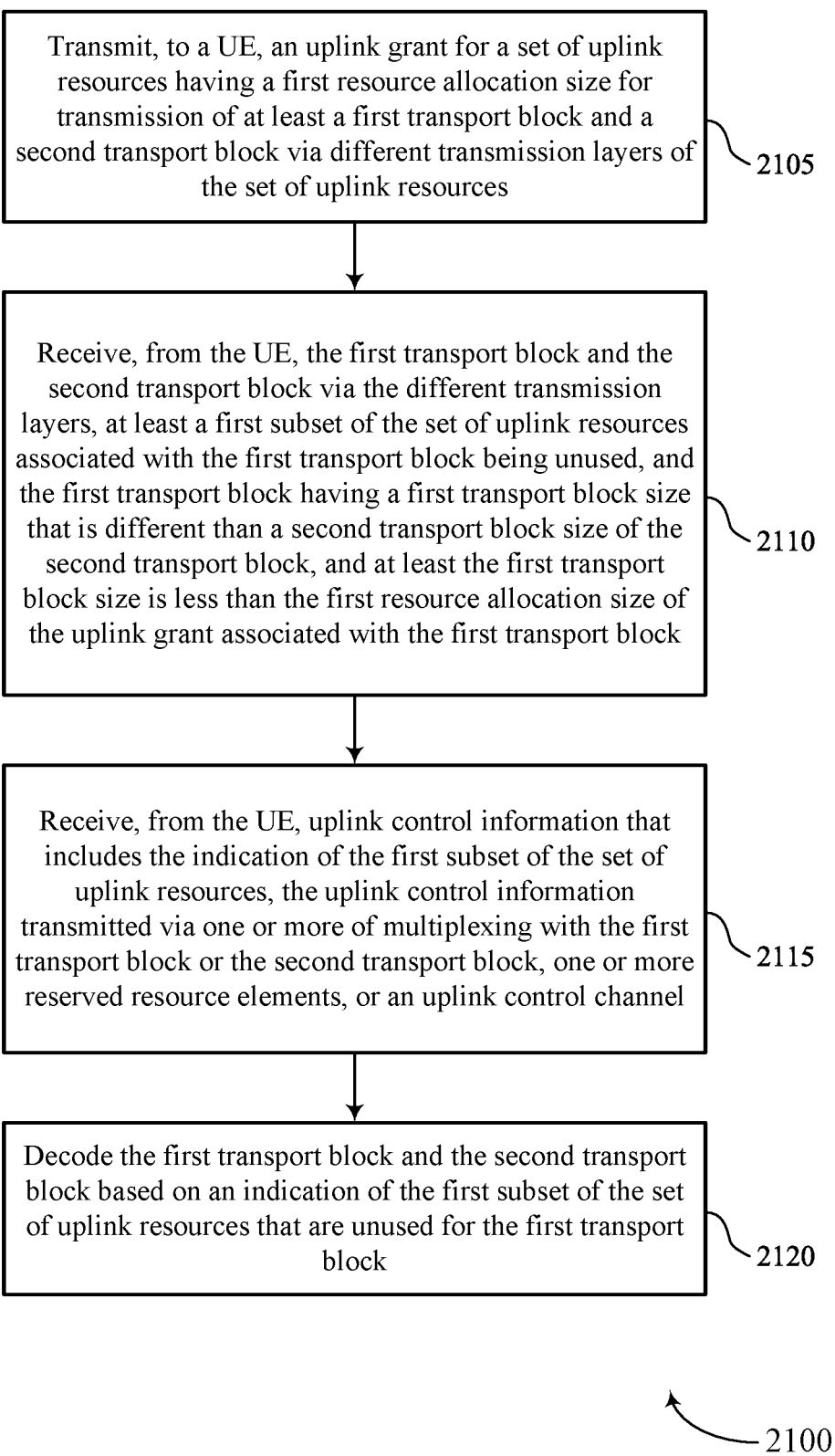

FIG. 21 illustrates a flowchart showing a method 2100 that supports partial uplink transmission for multiple uplink transport blocks in accordance with one or more aspects of the present disclosure. The operations of the method 2100 may be implemented by a network entity or its components as described herein. For example, the operations of the method 2100 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2105, the method may include transmitting, to a UE, an uplink grant for a set of uplink resources having a first resource allocation size for transmission of at least a first transport block and a second transport block via different transmission layers of the set of uplink resources. The operations of 2105 may be performed in accordance with examples as disclosed herein. In some examples, aspects of the operations of 2105 may be performed by an uplink grant manager 1225 as described with reference to FIG. 12.

At 2110, the method may include receiving, from the UE, the first transport block and the second transport block via the different transmission layers, at least a first subset of the set of uplink resources associated with the first transport block being unused, and the first transport block having a first transport block size that is different than a second transport block size of the second transport block, and at least the first transport block size is less than the first resource allocation size of the uplink grant associated with the first transport block. The operations of 2110 may be performed in accordance with examples as disclosed herein. In some examples, aspects of the operations of 2110 may be performed by a TB transmission manager 1230 as described with reference to FIG. 12.

At 2115, the method may include receiving, from the UE, uplink control information that includes the indication of the first subset of the set of uplink resources, the uplink control information transmitted via one or more of multiplexing with the first transport block or the second transport block, one or more reserved resource elements, or an uplink control channel. The operations of 2115 may be performed in accordance with examples as disclosed herein. In some examples, aspects of the operations of 2115 may be performed by a resource indication manager 1240 as described with reference to FIG. 12.

At 2120, the method may include decoding the first transport block and the second transport block based on an indication of the first subset of the set of uplink resources that are unused for the first transport block. The operations of 2120 may be performed in accordance with examples as disclosed herein. In some examples, aspects of the operations of 2120 may be performed by a decoder 1235 as described with reference to FIG. 12.

Figure 22:
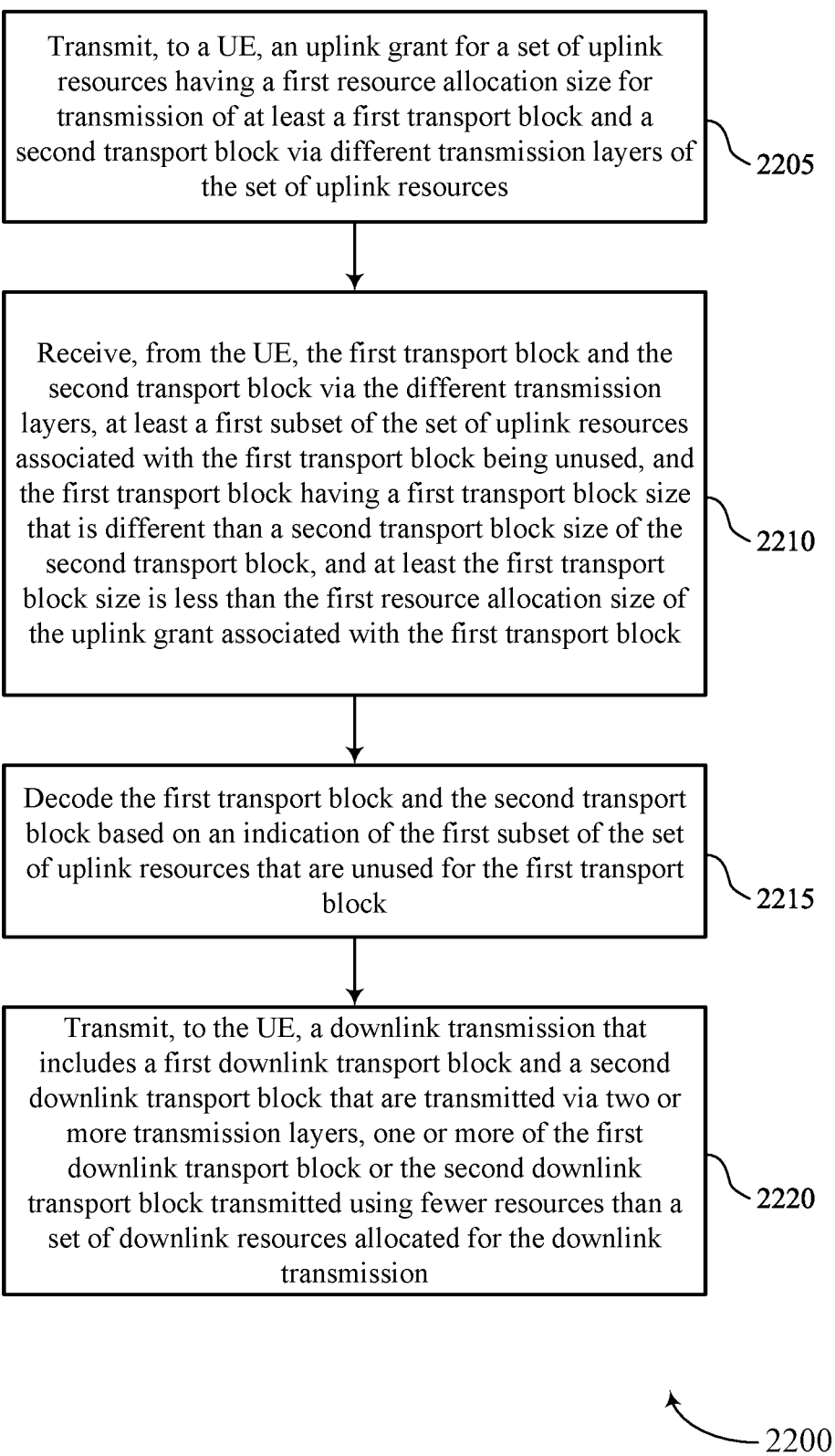

FIG. 22 illustrates a flowchart showing a method 2200 that supports partial uplink transmission for multiple uplink transport blocks in accordance with one or more aspects of the present disclosure. The operations of the method 2200 may be implemented by a network entity or its components as described herein. For example, the operations of the method 2200 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2205, the method may include transmitting, to a UE, an uplink grant for a set of uplink resources having a first resource allocation size for transmission of at least a first transport block and a second transport block via different transmission layers of the set of uplink resources. The operations of 2205 may be performed in accordance with examples as disclosed herein. In some examples, aspects of the operations of 2205 may be performed by an uplink grant manager 1225 as described with reference to FIG. 12.

At 2210, the method may include receiving, from the UE, the first transport block and the second transport block via the different transmission layers, at least a first subset of the set of uplink resources associated with the first transport block being unused, and the first transport block having a first transport block size that is different than a second transport block size of the second transport block, and at least the first transport block size is less than the first resource allocation size of the uplink grant associated with the first transport block. The operations of 2210 may be performed in accordance with examples as disclosed herein. In some examples, aspects of the operations of 2210 may be performed by a TB transmission manager 1230 as described with reference to FIG. 12.

At 2215, the method may include decoding the first transport block and the second transport block based on an indication of the first subset of the set of uplink resources that are unused for the first transport block. The operations of 2215 may be performed in accordance with examples as disclosed herein. In some examples, aspects of the operations of 2215 may be performed by a decoder 1235 as described with reference to FIG. 12.

At 2220, the method may include transmitting, to the UE, a downlink transmission that includes a first downlink transport block and a second downlink transport block that are transmitted via two or more transmission layers, one or more of the first downlink transport block or the second downlink transport block transmitted using fewer resources than a set of downlink resources allocated for the downlink transmission. The operations of 2220 may be performed in accordance with examples as disclosed herein. In some examples, aspects of the operations of 2220 may be performed by a TB transmission manager 1230 as described with reference to FIG. 12.

The following provides an overview of aspects of the present disclosure:

Aspect 1: A method for wireless communication at a UE, comprising: receiving an uplink grant for a set of uplink resources having a first resource allocation size for transmission of at least a first transport block and a second transport block via different transmission layers; encoding data to be transmitted via the first transport block and the second transport block, the first transport block having a first transport block size that is different than a second transport block size of the second transport block, and at least the first transport block size is less than the first resource allocation size of the uplink grant associated with the first transport block; transmitting the first transport block and the second transport block via the different transmission layers, at least a first subset of the set of uplink resources associated with the first transport block being unused; and transmitting an indication of the first subset of the set of uplink resources that are unused for the first transport block.

Aspect 2: The method of aspect 1, wherein the second transport block size is smaller than the first transport block size, and the encoding the data to be transmitted further comprises: extending the second transport block to have the first transport block size.

Aspect 3: The method of aspect 2, wherein the extending the second transport block comprises: adding one or more padding bits to the second transport block, or cyclically repeating the second transport block.

Aspect 4: The method of any of aspects 1 through 3, wherein the transmitting the indication comprises: transmitting uplink control information associated with a configured uplink grant that indicates the first subset of the set of uplink resources, the uplink control information transmitted via one or more of multiplexing with the first transport block or the second transport block, one or more reserved resource elements, or an uplink control channel.

Aspect 5: The method of any of aspects 1 through 4, further comprising: determining that a difference between the first transport block size and the first resource allocation size exceeds a threshold value, and wherein the first subset of the set of uplink resources are unused responsive to the determining.

Aspect 6: The method of aspect 5, wherein the threshold value corresponds to a configured percentage of the first resource allocation size.

Aspect 7: The method of any of aspects 1 through 6, wherein the second transport block size is smaller than the first transport block size, and the transmitting the first transport block and the second transport block further comprises: transmitting the second transport block using uplink resources in which a second subset of the set of uplink resources associated with the second transport block are unused, the second subset having a different size than the first subset.

Aspect 8: The method of aspect 7, wherein the transmitting the indication further comprises: transmitting an indication of the second subset of the set of uplink resources that are unused for the second transport block.

Aspect 9: The method of any of aspects 1 through 8, wherein the second transport block size is larger than the first transport block size and corresponds to the first resource allocation size associated with the second transport block, and the first transport block occupies fewer resources than the second transport block.

Aspect 10: The method of aspect 1, wherein the second transport block is transmitted using a lower modulation order, a lower coding rate, or both, relative to the first transport block, and occupies a same amount of uplink resources as the first transport block.

Aspect 11: The method of any of aspects 1 through 10, further comprising: receiving a downlink transmission that includes a first downlink transport block and a second downlink transport block that are transmitted via two or more transmission layers, one or more of the first downlink transport block or the second downlink transport block transmitted using fewer resources than a set of downlink resources allocated for the downlink transmission.

Aspect 12: The method of any of aspects 1 through 11, wherein the uplink grant for the set of uplink resources is a dynamic grant for a single set of uplink resources or is a configured grant for a plurality of sets of uplink resources.

Aspect 13: A method for wireless communication at a UE, comprising: receiving an uplink grant for at least first uplink resources, the uplink grant having a first resource allocation size; encoding data to be transmitted in the first uplink resources to generate encoded data, the encoded data occupying less than the first resource allocation size, wherein the UE is configured to skip transmissions in at least a subset of the first uplink resources when encoded data occupies less than all of the first resource allocation size; extending the encoded data to provide extended encoded data when an uplink control information communication is to be transmitted along with the encoded data in the first uplink resource; and transmitting the extended encoded data and the uplink control information communication in the first uplink resources.

Aspect 14: The method of aspect 13, wherein the uplink grant for the first uplink resources is a dynamic grant for physical uplink shared channel resources, and the uplink control information communication provides one or more of CSI or acknowledgment/negative-acknowledgment (ACK/NACK) feedback associated with one or more downlink transmissions.

Aspect 15: The method of any of aspects 13 through 14, wherein the uplink grant for the first uplink resources is a configured grant for a plurality of periodic sets of physical uplink shared channel resources, and the uplink control information communication provides one or more of CSI or acknowledgment/negative-acknowledgment (ACK/NACK) feedback associated with one or more downlink transmissions.

Aspect 16: The method of any of aspects 13 through 15, wherein the uplink grant for the first uplink resources is a dynamic grant for physical uplink shared channel resources or a configured grant for a plurality of periodic sets of physical uplink shared channel resources, the uplink control information communication provides one or more of CSI or acknowledgment/negative-acknowledgment (ACK/NACK) feedback associated with one or more downlink transmissions, and the extended coded data occupies an amount of the first uplink resources that corresponds to a size of the uplink control information communication that is multiplexed with the extended coded data.

Aspect 17: A method for wireless communication at a network entity, comprising: transmitting, to a UE, an uplink grant for a set of uplink resources having a first resource allocation size for transmission of at least a first transport block and a second transport block via different transmission layers of the set of uplink resources; receiving, from the UE, the first transport block and the second transport block via the different transmission layers, at least a first subset of the set of uplink resources associated with the first transport block being unused, and the first transport block having a first transport block size that is different than a second transport block size of the second transport block, and at least the first transport block size is less than the first resource allocation size of the uplink grant associated with the first transport block; and decoding the first transport block and the second transport block based at least in part on an indication of the first subset of the set of uplink resources that are unused for the first transport block.

Aspect 18: The method of aspect 17, wherein the second transport block size is smaller than the first transport block size, and the encoding the data to be transmitted further comprises: extending the second transport block to have the first transport block size.

Aspect 19: The method of any of aspects 17 through 18, further comprising: receiving, from the UE, uplink control information that includes the indication of the first subset of the set of uplink resources, the uplink control information transmitted via one or more of multiplexing with the first transport block or the second transport block, one or more reserved resource elements, or an uplink control channel.

Aspect 20: The method of any of aspects 17 through 19, further comprising: configuring the UE with a threshold value for skipping transmissions in the first subset of the set of uplink resources, the threshold value corresponding to percentage of the first resource allocation size.

Aspect 21: The method of any of aspects 17 through 20, wherein the second transport block size is larger than the first transport block size and corresponds to the first resource allocation size associated with the second transport block, and the first transport block occupies fewer resources than the second transport block.

Aspect 22: The method of any of aspects 17 through 21, further comprising: transmitting, to the UE, a downlink transmission that includes a first downlink transport block and a second downlink transport block that are transmitted via two or more transmission layers, one or more of the first downlink transport block or the second downlink transport block transmitted using fewer resources than a set of downlink resources allocated for the downlink transmission.

Aspect 23: An apparatus for wireless communication at a UE, comprising a processor; memory coupled with the processor; and instructions stored in the memory and executable by the processor to cause the apparatus to perform a method of any of aspects 1 through 12.

Aspect 24: An apparatus for wireless communication at a UE, comprising at least one means for performing a method of any of aspects 1 through 12.

Aspect 25: A non-transitory computer-readable medium storing code for wireless communication at a UE, the code comprising instructions executable by a processor to perform a method of any of aspects 1 through 12.

Aspect 26: An apparatus for wireless communication at a UE, comprising a processor; memory coupled with the processor; and instructions stored in the memory and executable by the processor to cause the apparatus to perform a method of any of aspects 13 through 16.

Aspect 27: An apparatus for wireless communication at a UE, comprising at least one means for performing a method of any of aspects 13 through 16.

Aspect 28: A non-transitory computer-readable medium storing code for wireless communication at a UE, the code comprising instructions executable by a processor to perform a method of any of aspects 13 through 16.

Aspect 29: An apparatus for wireless communication at a network entity, comprising a processor; memory coupled with the processor; and instructions stored in the memory and executable by the processor to cause the apparatus to perform a method of any of aspects 17 through 22.

Aspect 30: An apparatus for wireless communication at a network entity, comprising at least one means for performing a method of any of aspects 17 through 22.

Aspect 31: A non-transitory computer-readable medium storing code for wireless communication at a network entity, the code comprising instructions executable by a processor to perform a method of any of aspects 17 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   one or more processors;
   memory coupled with the one or more processors; and
   instructions stored in the memory and executable by the one or more processors to cause the apparatus to:
      receive an uplink grant for a set of uplink resources having a first resource allocation size for transmission of at least a first transport block and a second transport block via different transmission layers;
      encode data to be transmitted via the first transport block and the second transport block, the first transport block having a first transport block size that is different than a second transport block size of the second transport block, and at least the first transport block size is less than the first resource allocation size of the uplink grant associated with the first transport block;
      transmit the first transport block and the second transport block via the different transmission layers, at least a first subset of the set of uplink resources associated with the first transport block being unused; and
      transmit an indication of the first subset of the set of uplink resources that are unused for the first transport block.

2. The apparatus of claim 1, wherein the second transport block size is smaller than the first transport block size, and the instructions to encode the data to be transmitted are further executable by the one or more processors to cause the apparatus to:
   extend the second transport block to have the first transport block size.

3. The apparatus of claim 2, wherein the instructions to extend the second transport block are executable by the one or more processors to cause the apparatus to:
   add one or more padding bits to the second transport block, or cyclically repeating the second transport block.

4. The apparatus of claim 1, wherein the instructions to transmit the indication are executable by the one or more processors to cause the apparatus to:
   transmit uplink control information associated with a configured uplink grant that indicates the first subset of the set of uplink resources, the uplink control information transmitted via one or more of multiplexing with the first transport block or the second transport block, one or more reserved resource elements, or an uplink control channel.

5. The apparatus of claim 1, wherein the instructions are further executable by the one or more processors to cause the apparatus to:
   determine that a difference between the first transport block size and the first resource allocation size exceeds a threshold value, and wherein the first subset of the set of uplink resources are unused responsive to the determining.

6. The apparatus of claim 5, wherein the threshold value corresponds to a configured percentage of the first resource allocation size.

7. The apparatus of claim 1, wherein the second transport block size is smaller than the first transport block size, and the instructions to transmit the first transport block and the second transport block are further executable by the one or more processors to cause the apparatus to:
   transmit the second transport block using uplink resources in which a second subset of the set of uplink resources associated with the second transport block are unused, the second subset having a different size than the first subset.

8. The apparatus of claim 7, wherein the instructions to transmit the indication are further executable by the one or more processors to cause the apparatus to:
   transmit an indication of the second subset of the set of uplink resources that are unused for the second transport block.

9. The apparatus of claim 1, wherein the second transport block size is larger than the first transport block size and corresponds to the first resource allocation size associated with the second transport block, and the first transport block occupies fewer resources than the second transport block.

10. The apparatus of claim 1, wherein the second transport block is transmitted using a lower modulation order, a lower coding rate, or both, relative to the first transport block, and occupies a same amount of uplink resources as the first transport block.

11. The apparatus of claim 1, wherein the instructions are further executable by the one or more processors to cause the apparatus to:
receive a downlink transmission that includes a first downlink transport block and a second downlink transport block that are transmitted via two or more transmission layers, one or more of the first downlink transport block or the second downlink transport block transmitted using fewer resources than a set of downlink resources allocated for the downlink transmission.

12. The apparatus of claim 1, wherein the uplink grant for the set of uplink resources is a dynamic grant for a single set of uplink resources or is a configured grant for a plurality of sets of uplink resources.

13. An apparatus for wireless communication at a user equipment (UE), comprising:
one or more processors;
memory coupled with the one or more processors; and
instructions stored in the memory and executable by the one or more processors to cause the apparatus to:
receive an uplink grant for at least first uplink resources, the uplink grant having a first resource allocation size;
encode data to be transmitted in the first uplink resources to generate encoded data, the encoded data occupying less than the first resource allocation size, wherein the UE is configured to skip transmissions in at least a subset of the first uplink resources when the encoded data occupies less than all of the first resource allocation size;
extend the encoded data to provide extended encoded data when an uplink control information communication is to be transmitted along with the encoded data in the first uplink resources; and
transmit the extended encoded data and the uplink control information communication in the first uplink resources.

14. The apparatus of claim 13, wherein the uplink grant for the first uplink resources is a dynamic grant for physical uplink shared channel resources, and the uplink control information communication provides one or more of channel state information (CSI) or acknowledgment/negative-acknowledgment (ACK/NACK) feedback associated with one or more downlink transmissions.

15. The apparatus of claim 13, wherein the uplink grant for the first uplink resources is a configured grant for a plurality of periodic sets of physical uplink shared channel resources, and the uplink control information communication provides one or more of channel state information (CSI) or acknowledgment/negative-acknowledgment (ACK/NACK) feedback associated with one or more downlink transmissions.

16. The apparatus of claim 13, wherein:
the uplink grant for the first uplink resources is a dynamic grant for physical uplink shared channel resources or a configured grant for a plurality of periodic sets of physical uplink shared channel resources,
the uplink control information communication provides one or more of channel state information (CSI) or acknowledgment/negative-acknowledgment (ACK/NACK) feedback associated with one or more downlink transmissions, and
the encoded data occupies an amount of the first uplink resources that corresponds to a size of the uplink control information communication that is multiplexed with the encoded data.

17. An apparatus for wireless communication at a network entity, comprising:
one or more processors;
memory coupled with the one or more processors; and
instructions stored in the memory and executable by the one or more processors to cause the apparatus to:
transmit, to a user equipment (UE), an uplink grant for a set of uplink resources having a first resource allocation size for transmission of at least a first transport block and a second transport block via different transmission layers of the set of uplink resources;
receive, from the UE, the first transport block and the second transport block via the different transmission layers, at least a first subset of the set of uplink resources associated with the first transport block being unused, and the first transport block having a first transport block size that is different than a second transport block size of the second transport block, and at least the first transport block size is less than the first resource allocation size of the uplink grant associated with the first transport block; and
decode the first transport block and the second transport block based at least in part on an indication of the first subset of the set of uplink resources that are unused for the first transport block.

18. The apparatus of claim 17, wherein the second transport block size is smaller than the first transport block size, and the instructions to decode the first transport block are further executable by the one or more processors to cause the apparatus to:
decode the second transport block based on the first transport block size, and wherein the second transport block is extended to correspond to the first transport block size.

19. The apparatus of claim 17, wherein the instructions are further executable by the one or more processors to cause the apparatus to:
receive, from the UE, uplink control information that includes the indication of the first subset of the set of uplink resources, the uplink control information transmitted via one or more of multiplexing with the first transport block or the second transport block, one or more reserved resource elements, or an uplink control channel.

20. The apparatus of claim 17, wherein the instructions are further executable by the one or more processors to cause the apparatus to:
configure the UE with a threshold value for skipping transmissions in the first subset of the set of uplink resources, the threshold value corresponding to percentage of the first resource allocation size.

21. The apparatus of claim 17, wherein the second transport block size is larger than the first transport block size and corresponds to the first resource allocation size associated with the second transport block, and the first transport block occupies fewer resources than the second transport block.

22. The apparatus of claim 17, wherein the instructions are further executable by the one or more processors to cause the apparatus to:
transmit, to the UE, a downlink transmission that includes a first downlink transport block and a second downlink transport block that are transmitted via two or more transmission layers, one or more of the first downlink transport block or the second downlink transport block transmitted using fewer resources than a set of downlink resources allocated for the downlink transmission.

23. A method for wireless communication at a user equipment (UE), comprising:
receiving an uplink grant for a set of uplink resources having a first resource allocation size for transmission of at least a first transport block and a second transport block via different transmission layers;
encoding data to be transmitted via the first transport block and the second transport block, the first transport block having a first transport block size that is different than a second transport block size of the second transport block, and at least the first transport block size is less than the first resource allocation size of the uplink grant associated with the first transport block;
transmitting the first transport block and the second transport block via the different transmission layers, at least a first subset of the set of uplink resources associated with the first transport block being unused; and
transmitting an indication of the first subset of the set of uplink resources that are unused for the first transport block.

24. The method of claim 23, wherein the second transport block size is smaller than the first transport block size, and the encoding data to be transmitted further comprises:
extending the second transport block to have the first transport block size.

25. The method of claim 24, wherein the extending the second transport block comprises:
adding one or more padding bits to the second transport block, or cyclically repeating the second transport block.

26. The method of claim 23, wherein the transmitting the indication comprises:
transmitting uplink control information associated with a configured uplink grant that indicates the first subset of the set of uplink resources, the uplink control information transmitted via one or more of multiplexing with the first transport block or the second transport block, one or more reserved resource elements, or an uplink control channel.

27. The method of claim 23, further comprising:
determining that a difference between the first transport block size and the first resource allocation size exceeds a threshold value, and wherein the first subset of the set of uplink resources are unused responsive to the determining.

28. The method of claim 23, wherein the second transport block size is smaller than the first transport block size, and the transmitting the first transport block and the second transport block further comprises:
transmitting the second transport block using uplink resources in which a second subset of the set of uplink resources associated with the second transport block are unused, the second subset having a different size than the first subset.

29. The method of claim 23, further comprising:
receiving a downlink transmission that includes a first downlink transport block and a second downlink transport block that are transmitted via two or more transmission layers, one or more of the first downlink transport block or the second downlink transport block transmitted using fewer resources than a set of downlink resources allocated for the downlink transmission.

30. The method of claim 23, wherein the uplink grant for the set of uplink resources is a dynamic grant for a single set of uplink resources or is a configured grant for a plurality of sets of uplink resources.

* * * * *